US008266075B2

(12) United States Patent
Ambrosio et al.

(10) Patent No.: US 8,266,075 B2
(45) Date of Patent: Sep. 11, 2012

(54) ELECTRIC VEHICLE CHARGING TRANSACTION INTERFACE FOR MANAGING ELECTRIC VEHICLE CHARGING TRANSACTIONS

(75) Inventors: Ronald Ambrosio, Poughquag, NY (US); Erica Haefner Ferro, Boulder, CO (US); James Lee Hafner, San Jose, CA (US); Colin George Harrison, Brookfield, CT (US); Melissa Wiltsey O'Mara, Tully, NY (US); Allan James Schurr, Castle Rock, CO (US); Mark William Trekell, Aurora, CO (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 12/139,574

(22) Filed: Jun. 16, 2008

(65) Prior Publication Data

US 2009/0313103 A1 Dec. 17, 2009

(51) Int. Cl.
*H02J 7/00* (2006.01)
*G01R 11/56* (2006.01)
(52) U.S. Cl. ......... 705/412; 705/30; 705/17; 705/14.38; 320/109
(58) Field of Classification Search .................. None
See application file for complete search history.

(56) References Cited

U.S. PATENT DOCUMENTS

| 3,867,682 A | 2/1975 | Yamauchi et al. |
| 4,389,608 A | 6/1983 | Dahl et al. |
| 4,433,278 A | 2/1984 | Lowndes et al. |
| 4,532,418 A | 7/1985 | Meese et al. |
| 5,422,624 A | 6/1995 | Smith |
| 5,548,200 A * | 8/1996 | Nor et al. ...................... 320/109 |
| 5,563,491 A | 10/1996 | Tseng |
| 5,594,318 A * | 1/1997 | Nor et al. ...................... 320/108 |
| 5,736,833 A | 4/1998 | Farris |
| 6,067,008 A | 5/2000 | Smith |
| 6,081,205 A * | 6/2000 | Williams ................... 340/932.2 |

(Continued)

FOREIGN PATENT DOCUMENTS

JP 2001359203 A 12/2001

(Continued)

OTHER PUBLICATIONS

USPTO Non-final office action dated Oct. 6, 2010 regarding U.S. Appl. No. 12/139,561.

(Continued)

*Primary Examiner* — Faris Almatrahi
(74) *Attorney, Agent, or Firm* — Yee & Associates, P.C.; David A. Mims, Jr.

(57) ABSTRACT

Illustrative embodiments manage an electric vehicle charging transaction. A set of principals associated with the electric vehicle charging transaction is identified. Electric vehicle charging information is retrieved from a set of sources. An energy transaction plan is generated using the electric vehicle charging information. A charging phase of the electric vehicle charging transaction is initiated for an electric vehicle connected to a charging station in accordance with the energy transaction plan. The charging phase comprises at least one of charging the electric vehicle with electricity, storing electricity in an electric storage mechanism associated with the electric vehicle, and removing electricity from the electric storage mechanism to de-charge the electric vehicle. In response to completion of the charging phase, the process then settles the financial obligations of a subset of principals in accordance with the energy transaction plan.

10 Claims, 13 Drawing Sheets

U.S. PATENT DOCUMENTS

| | | |
|---|---|---|
| 6,234,932 B1 | 5/2001 | Kuroda et al. |
| 6,252,380 B1 | 6/2001 | Koenck |
| 6,285,931 B1 | 9/2001 | Hattori et al. |
| 6,301,531 B1 | 10/2001 | Pierro et al. |
| 6,307,349 B1 | 10/2001 | Koenck et al. |
| 6,373,380 B1 | 4/2002 | Robertson et al. |
| 6,456,041 B1 | 9/2002 | Terada et al. |
| 6,466,658 B2 | 10/2002 | Schelberg, Jr. et al. |
| 6,586,866 B1 | 7/2003 | Ikedo et al. |
| 6,727,809 B1 | 4/2004 | Smith |
| 6,741,036 B1 | 5/2004 | Ikedo et al. |
| 6,766,949 B2 | 7/2004 | Terranova et al. |
| 6,789,733 B2 | 9/2004 | Terranova et al. |
| 6,794,849 B2 | 9/2004 | Mori et al. |
| 6,850,898 B1 | 2/2005 | Murakami et al. |
| 7,039,389 B2 | 5/2006 | Johnson, Jr. |
| 7,402,978 B2 | 7/2008 | Pryor |
| 7,565,396 B2 | 7/2009 | Hoshina |
| 7,674,536 B2 | 3/2010 | Chipchase et al. |
| 7,693,609 B2 | 4/2010 | Kressner et al. |
| 7,885,893 B2 | 2/2011 | Alexander |
| 7,949,435 B2 | 5/2011 | Pollack et al. |
| 7,956,570 B2 | 6/2011 | Lowenthal et al. |
| 7,991,665 B2 | 8/2011 | Hafner et al. |
| 8,054,048 B2 | 11/2011 | Woody et al. |
| 8,103,391 B2 | 1/2012 | Ferro et al. |
| 2002/0064258 A1 | 5/2002 | Schelberg, Jr. et al. |
| 2003/0137277 A1 | 7/2003 | Mori et al. |
| 2003/0153278 A1 | 8/2003 | Johnson, Jr. |
| 2003/0205619 A1 | 11/2003 | Terranova et al. |
| 2004/0046506 A1 | 3/2004 | Kawai et al. |
| 2004/0265671 A1 | 12/2004 | Chipchase et al. |
| 2005/0044245 A1 | 2/2005 | Hoshina |
| 2005/0231119 A1 | 10/2005 | Ito et al. |
| 2006/0182241 A1 | 8/2006 | Schelberg, Jr. et al. |
| 2006/0282381 A1 | 12/2006 | Ritchie |
| 2006/0287783 A1 | 12/2006 | Walker |
| 2007/0126395 A1 | 6/2007 | Suchar |
| 2007/0282495 A1 | 12/2007 | Kempton et al. |
| 2008/0039979 A1 | 2/2008 | Bridges et al. |
| 2008/0039989 A1 | 2/2008 | Pollack et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek et al. |
| 2008/0155008 A1 | 6/2008 | Stiles et al. |
| 2008/0180027 A1 | 7/2008 | Matsushita et al. |
| 2008/0228613 A1* | 9/2008 | Alexander ............. 705/35 |
| 2008/0281663 A1 | 11/2008 | Hakim et al. |
| 2009/0021213 A1* | 1/2009 | Johnson ............. 320/109 |
| 2009/0030712 A1 | 1/2009 | Bogolea et al. |
| 2009/0043519 A1 | 2/2009 | Bridges et al. |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean et al. |
| 2009/0144001 A1 | 6/2009 | Leonard et al. |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek et al. |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0017045 A1 | 1/2010 | Nesler et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0169008 A1 | 7/2010 | Niwa et al. |

FOREIGN PATENT DOCUMENTS

| | | |
|---|---|---|
| JP | 2006262570 A | 9/2006 |

OTHER PUBLICATIONS

USPTO Non-final office action dated Jan. 7, 2011 regarding U.S. Appl. No. 12/139,561.
USPTO Non-final office action dated Jul. 11, 2011 regarding U.S. Appl. No. 12/139,561.
USPTO Non-final office action dated Jun. 20, 2011 regarding U.S. Appl. No. 12/194,325.
USPTO Final office action dated Nov. 29, 2010 regarding U.S. Appl. No. 12/194,290.
USPTO Notice of Allowance dated Sep. 14, 2011, for U.S. Appl. No. 12/194,325.
Brooks, "State Unveils Plan to Help Drivers Recharge Their Electric Vehicles", Los Angeles Times, Los Angeles CA, Aug. 29, 1998, D1.
Wildman, "Gas-Free Nation", New York Times Magazine, New York, Apr. 20, 2008, p. 69.
USPTO office action for U.S. Appl. No. 12/194,341 dated Mar. 25, 2011.
USPTO final office action for U.S. Appl. No. 12/194,210 dated Mar. 25, 2011.
USPTO notice of allowance for U.S. Appl. No. 12/139,575 dated Mar. 8, 2011.
USPTO office action for U.S. Appl. No. 12/139,569 dated Apr. 25, 2011.
USPTO office action for U.S. Appl. No. 12/139,565 dated Jun. 1, 2011.
USPTO office action for U.S. Appl. No. 12/139,571 dated Apr. 25, 2011.
USPTO office action for U.S. Appl. No. 12/194,290 dated Jun. 4, 2010.
USPTO office action for U.S. Appl. No. 12/139,575 dated Oct. 8, 2010.
USPTO office action for U.S. Appl. No. 12/194,210 dated Nov. 22, 2010.
U.S. Appl. No. 12/139,562, filed Jun. 16, 2008, Hafner et al.
U.S. Appl. No. 12/139,564, filed Jun. 16, 2008, Hafner et al.
U.S. Appl. No. 12/139,565, filed Jun. 16, 2008, Hafner et al.
U.S. Appl. No. 12/139,569, filed Jun. 16, 2008, Ferro et al.
U.S. Appl. No. 12/139,571, filed Jun. 16, 2008, Hafner et al.
U.S. Appl. No. 12/194,245, filed Aug. 19, 2008, Ferro et al.
U.S. Appl. No. 12/194,325, filed Aug. 19, 2008, Ferro et al.
U.S. Appl. No. 12/194,341, filed Aug. 19, 2008, Ambrosio et al.
U.S. Appl. No. 12/194,210, filed Aug. 19, 2008, Ambrosio et al.
U.S. Appl. No. 12/194,290, filed Aug. 19, 2008, Ferro et al.
U.S. Appl. No. 12/139,561, filed Jun. 16, 2008, Hafner et al.
U.S. Appl. No. 12/139,575, filed Jun. 16, 2008, Hafner et al.
Hafner et al., U.S. Appl. No. 13/430,864, filed Mar. 27, 2012, 55 pages.
Ambrosio et al., U.S. Appl. No. 13/431,539, filed Mar. 27, 2012, 66 pages.
USPTO Office Action dated Feb. 2, 2012, regarding U.S. Appl. No. 12/139,561, 12 pages.
USPTO Office Action dated Oct. 3, 2011, regarding U.S. Appl. No. 12/139,562, 65 pages.
USPTO Final Office Action dated Feb. 7, 2012, regarding U.S. Appl. No. 12/139,562, 47 pages.
USPTO Office Action dated Jan. 5, 2012, regarding U.S. Appl. No. 12/139,564, 26 pages.
USPTO Final Office Action dated Oct. 26, 2011, regarding U.S. Appl. No. 12/139,565, 27 pages.
USPTO Final Office Action dated Oct. 19, 2011, regarding U.S. Appl. No. 12/139,569, 35 pages.
USPTO Final Office Action dated Oct. 14, 2011, regarding U.S. Appl. No. 12/139,571, 36 pages.
Appeal Brief dated Aug. 24, 2011, regarding U.S. Appl. No. 12/194,210, 35 pages.
USPTO Examiner's Answer dated Nov. 2, 2011, regarding U.S. Appl. No. 12/194,210, 21 pages.
Reply Brief dated Dec. 21, 2011, regarding U.S. Appl. No. 12/194,210, 15 pages.

USPTO Office Action dated Nov. 18, 2011, regarding U.S. Appl. No. 12/194,245, 40 pages.
Appeal Brief dated May 2, 2011, regarding U.S. Appl. No. 12/194,290, 57 pages.
USPTO Examiner's Answer dated Jul. 6, 2011, regarding U.S. Appl. No. 12/194,290, 24 pages.
Reply Brief dated Sep. 6, 2011, regarding U.S. Appl. No. 12/194,290, 9 pages.
USPTO Final Office Action dated Oct. 17, 2011, regarding U.S. Appl. No. 12/194,341, 15 pages.
Office Action, dated Mar. 1, 2012, regarding U.S. Appl. No. 12/139,562, 8 pages.
Final Office Action, dated May 11, 2012, regarding U.S. Appl. No. 12/194,245, 32 pages.

* cited by examiner

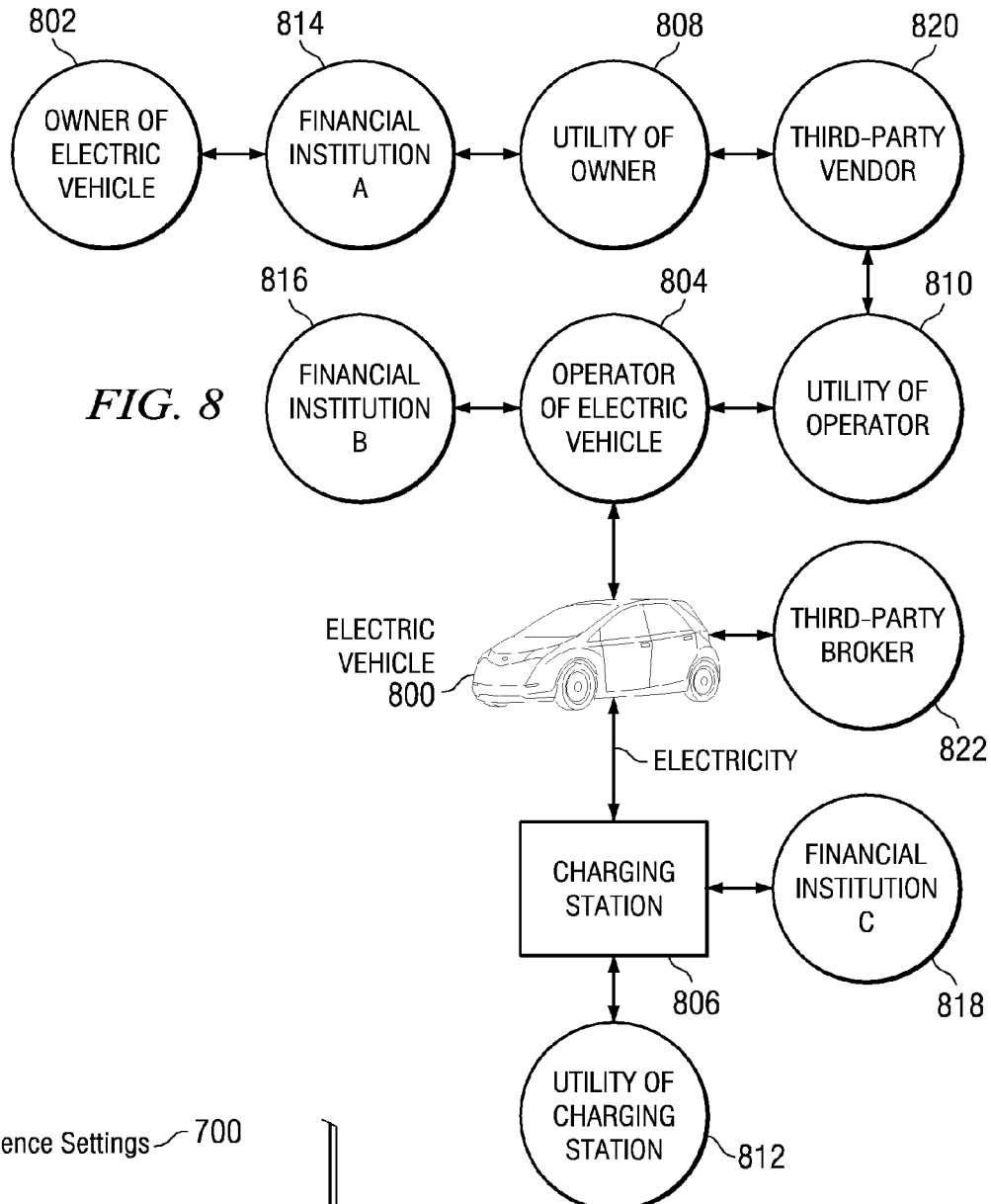

ELECTRIC VEHICLE CHARGING TRANSACTION INTERFACE FOR MANAGING ELECTRIC VEHICLE CHARGING TRANSACTIONS

BACKGROUND OF THE INVENTION

1. Field of the Invention

The present invention is related generally to an improved data processing system, and in particular, to a method and apparatus for managing electric vehicle charging transactions. More particularly, the present invention is directed to a computer implemented method, apparatus, and computer usable program code for managing multiple aspects of electric vehicle charging transactions.

2. Description of the Related Art

Electric vehicles (EV) can be divided into two categories: totally electric vehicles (TEV) and plug-in hybrid electric vehicles (PHEV). Plug-in hybrid vehicles utilize two or more power sources to drive the vehicle. With the increasing costs of fossil fuels and concern over reliance on non-renewable resources, electric vehicles are poised to become a critical component of transportation systems throughout the world. Gasoline powered vehicles utilize the explosive power of a mixture of gasoline and air to propel the vehicle. In contrast, electric vehicles rely in whole or in part on electric power to drive the vehicle.

Electric vehicles contain electric storage mechanisms, such as batteries, to store electricity until it is needed to power the electric vehicle. The electric storage mechanisms require periodic charging to replenish the electric charge for continued operation. The electricity used to charge the electric storage mechanisms may be provided by any type of on-vehicle power generation and charging mechanism. The on-vehicle power generation and charging mechanisms may include consumptive power generation systems and/or non-consumptive power generation systems, such as, without limitation, fuel cells, gasoline powered combustion engines, bio-diesel powered engines, solar powered generators and regenerative braking systems.

In totally electric vehicles and plug-in hybrid electric vehicles, charging of the electric vehicles can also be accomplished by plugging the electric vehicle into an off-vehicle charging station. The off-vehicle charging station provides an external source of electricity, such as, an electric power grid. Totally electric vehicles require this type of off-vehicle charging in all cases. Off-vehicle charging is also likely to be significantly less expensive for plug-in hybrid electric vehicles than on-vehicle charging given currently available technology. Consequently off-vehicle charging may be the preferred charging mode for electric vehicle owners.

The power stored in the electric storage mechanisms on the electric vehicles and on-vehicle power generation mechanisms may be used to provide electricity back to the electricity grid. For electric vehicles to be used as suppliers of electric power to an electric power grid, electric vehicles are connected to an off-vehicle infrastructure which can efficiently consume the electricity generated or stored by the electric vehicle. To date, electric vehicle manufacturers and electric utility companies have only planned and provided infrastructure and methods for the most rudimentary charging scenario in which the electric vehicle is plugged into a common electric outlet.

BRIEF SUMMARY OF THE INVENTION

According to one embodiment of the present invention, a computer implemented method, apparatus, and computer program product is provided for managing an electric vehicle charging transaction. A set of principals associated with the electric vehicle charging transaction is identified. A principal in the set of principals is an entity having an interest in the electric vehicle charging transaction. Electric vehicle charging information is retrieved from a set of sources. An energy transaction plan is generated using the electric vehicle charging information. A charging phase of the electric vehicle charging transaction is initiated for an electric vehicle connected to a charging station in accordance with the energy transaction plan. The charging phase comprises at least one of charging the electric vehicle with electricity, storing electricity in an electric storage mechanism associated with the electric vehicle, and removing electricity from the electric storage mechanism to de-charge the electric vehicle. In response to completion of the charging phase, the process settles the financial obligations of a subset of principals in the set of principals in accordance with the energy transaction plan.

BRIEF DESCRIPTION OF THE SEVERAL VIEWS OF THE DRAWINGS

FIG. 7 is a block diagram of preference settings in accordance with an illustrative embodiment;

FIG. 8 is a block diagram of parties to an electric vehicle charging transaction in accordance with an illustrative embodiment;

FIG. 15 is a flowchart of a process for a post-charge process in an electric vehicle charge transaction in accordance with an illustrative embodiment.

DETAILED DESCRIPTION OF THE INVENTION

Figure 1:
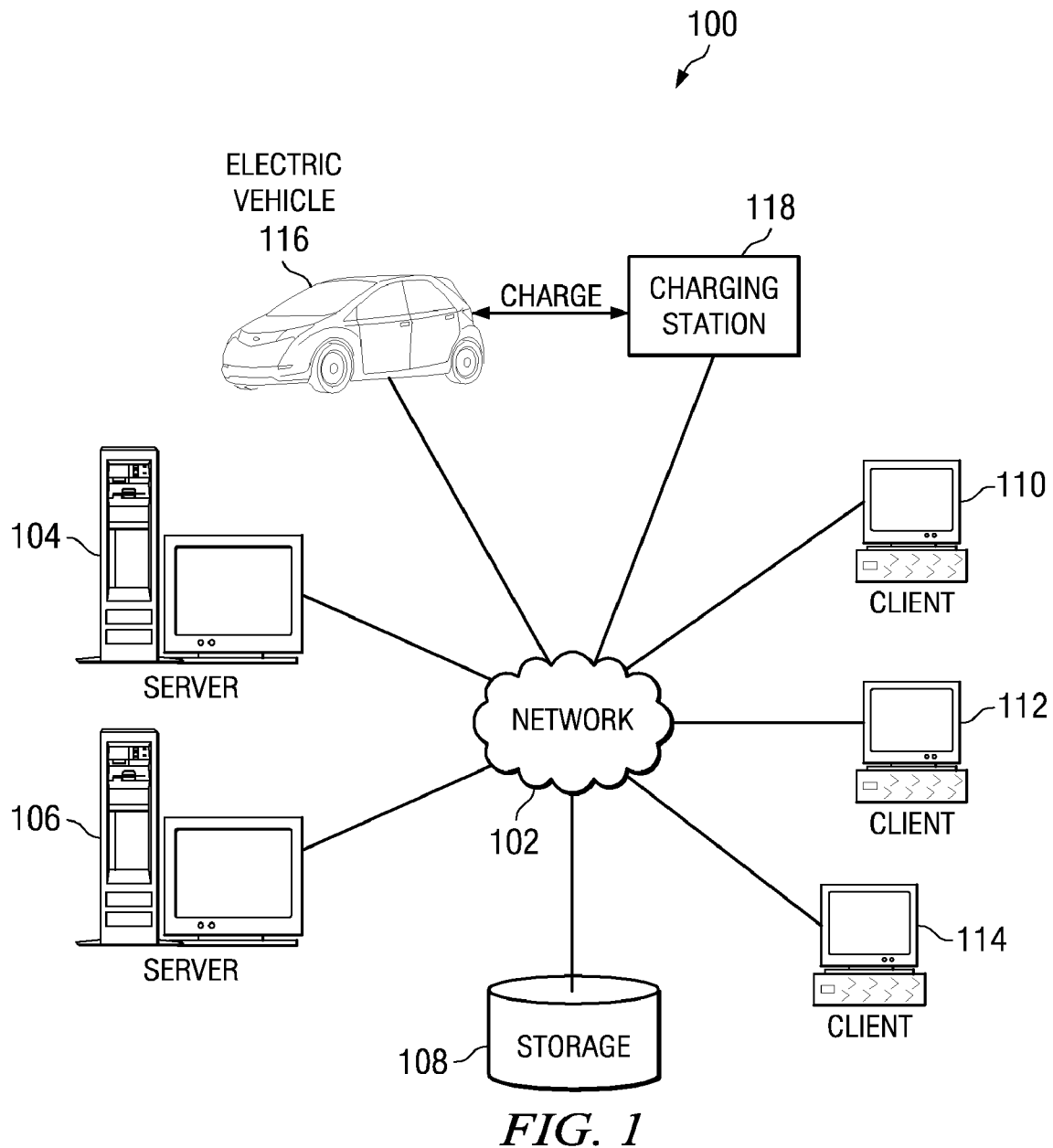
FIG. 1 is a block diagram of a network of data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
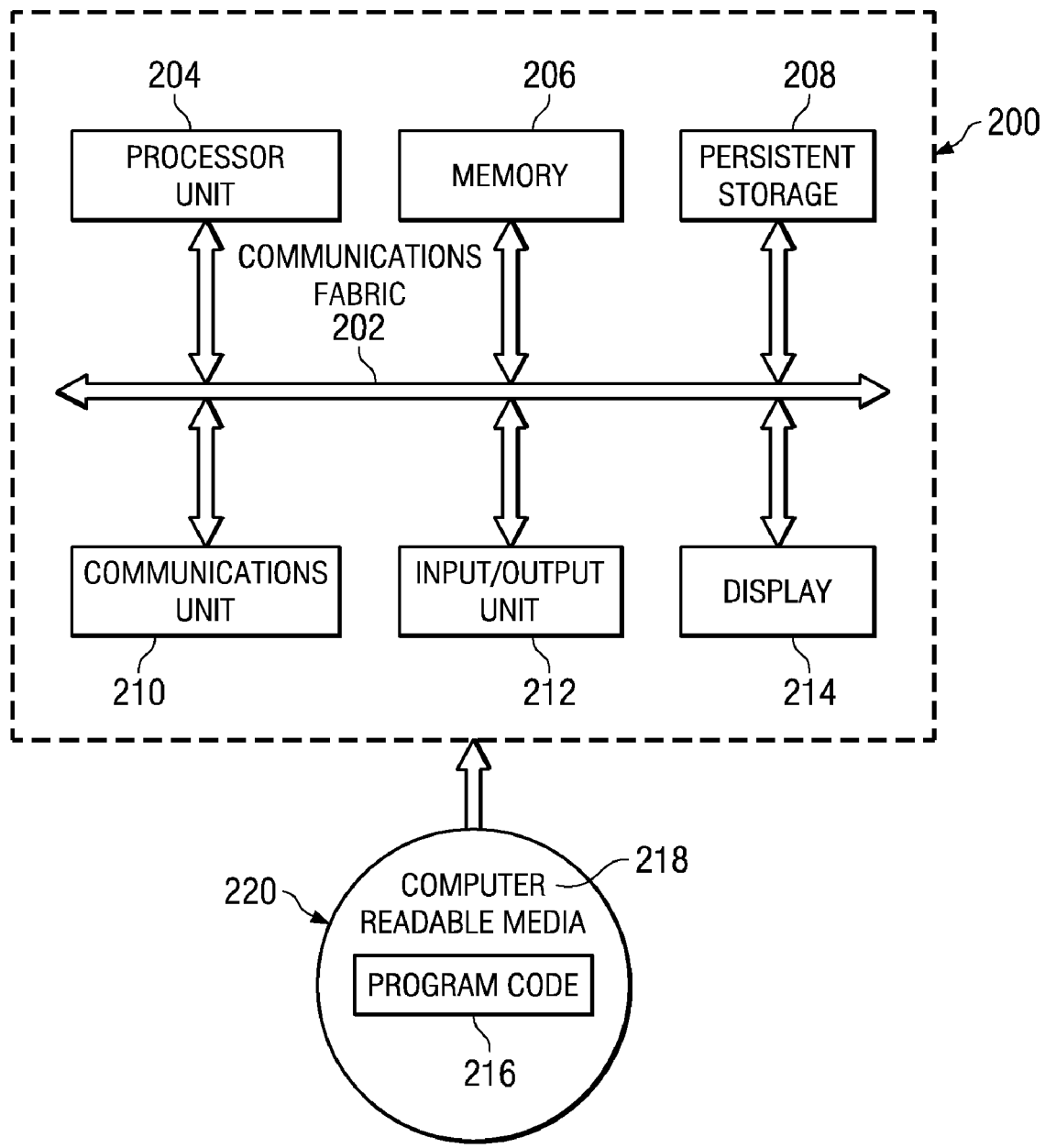
FIG. 2 is a block diagram of a data processing system in which illustrative embodiments may be implemented.

With reference now to the figures, and in particular, with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing system in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Electric vehicle 116 is any vehicle that utilizes electric power in whole or in part to drive the vehicle that is capable of being plugged into charging station 118. Electric vehicle 116 may be a totally electric vehicle or a plug-in hybrid electric vehicle. The plug-in electric hybrid vehicle may be a gasoline/electric hybrid, a natural gas/electric hybrid, a diesel/electric hybrid, a biodiesel/electric hybrid, or any other type of plug-in electric hybrid. Electric vehicle 116 may optionally include an on-vehicle power generation mechanism such as, but without limitation, solar power electric generators, gasoline powered electric generators, biodiesel powered electric generator, or any other type of on-vehicle electric power generation mechanism. Electric vehicle 116 in this embodiment includes an electric vehicle charging transaction interface (not shown) for managing multiple aspects of charging transactions.

Charging station 118 is any station, kiosk, garage, power outlet, or other facility for providing electricity to electric vehicle 116. Electric vehicle 116 receives electricity from, or provides electricity to, an electric grid at charging station 118. In other words, electric charge may flow from an electric grid through charging station 118 to electric vehicle 116 or the electric charge may flow from electric vehicle 116 back into the electric grid through charging station 118. Charging station 118 is a selected charge/discharge site, such as an outlet or kiosk, for providing electric vehicle 116 with access to the electric grid. For example, and without limitation, charging station 118 may be a power outlet in a privately owned garage, an electric outlet in a docking station in a commercially owned electric vehicle charging kiosk, or a power outlet in a commercially owned garage.

Electric vehicle 116 connects to charging station 118 via an electrical outlet or other electricity transfer mechanism. The electricity may also be optionally transferred via wireless energy transfer, also referred to as wireless power transfer, in which electrical energy is transferred to a load, such as electric vehicle 116, without interconnecting wires. The electricity may flow from charging station 118 into electric vehicle to charge electric vehicle 116. The electricity may also flow from electric vehicle 116 into charging station 118 to sell electricity back to the power grid.

Electric vehicle 116 and charging station 118 are optionally connected to network 102. Electric vehicle 116 and charging station 118 send and receive data associated with the charging of electric vehicle, the capabilities of electric vehicle, the capabilities of charging station 118, the current charge stored in electric vehicle, the rate of charging electric vehicle, the price of electricity received from a power grid, identity of the owner and/or operator of electric vehicle 116 and/or any other data relevant to charging or de-charging electric vehicle 116 over network 102.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. Data processing system 200 may also be implemented as a computing device on-board an electric vehicle, such as electric vehicle 116 in FIG. 1.

In this illustrative example, data processing system 200 includes communications fabric 202, which provides communications between processor unit 204, memory 206, persistent storage 208, communications unit 210, input/output (I/O) unit 212, and display 214. Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. In another example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to present information to a user. The information may be presented in a visual or graphical format on a display, in an audio format, presented as a combination of audio and visual content, presented in a raised format that can be read by the blind, or in any other format.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Currently, electric vehicle manufacturers and electric utility companies have only planned and provided infrastructure for the most rudimentary charging scenarios, such as, merely plugging the electric vehicle into a common electric outlet that is owned by the owner and operator of the electric vehicle. The illustrative embodiments recognize that charging electric vehicles will frequently be conducted under much broader and more complex sets of circumstances than this simple scenario and infrastructure is needed to accommodate these complex transactions. For example, owners and operators of electric vehicles will frequently be required to charge their electric vehicle at a charging station that is remote from the home of the electric vehicle owner. In most circumstances, it is unlikely that the electric vehicle owner will own the off-vehicle charging stations from which the owner obtains electricity to recharge the electric vehicle. In such a situation, the owner or operator of the electric vehicle will likely be required to pay for the charge obtained from the off-vehicle charging station.

The illustrative embodiments recognize that the charging transactions by which electric vehicles obtain electricity from an off-vehicle charging station to charge the electric vehicle requires a much more complete, flexible, and interoperable system governing all aspects of the charging transaction. Electric vehicle charging transactions can be divided into the pre-charge phase, the charge phase, and the post-charge phase.

Therefore, one embodiment provides a computer implemented method, apparatus, and computer program product for managing an electric vehicle charging transaction. A set of principals associated with the electric vehicle charging transaction is identified. A principal in the set of principals is an entity having an interest in the electric vehicle charging transaction. Electric vehicle charging information is retrieved from a set of sources. An energy transaction plan is generated using the electric vehicle charging information. A charging phase of the electric vehicle charging transaction is initiated for an electric vehicle connected to a charging station in accordance with the energy transaction plan. The charging phase comprises at least one of charging the electric vehicle with electricity, storing electricity in an electric storage mechanism associated with the electric vehicle, and removing electricity from the electric storage mechanism to de-charge the electric vehicle. In response to completion of the charging phase, the financial obligations of a subset of principals in the set of principals are settled in accordance with the energy transaction plan.

Figure 3:
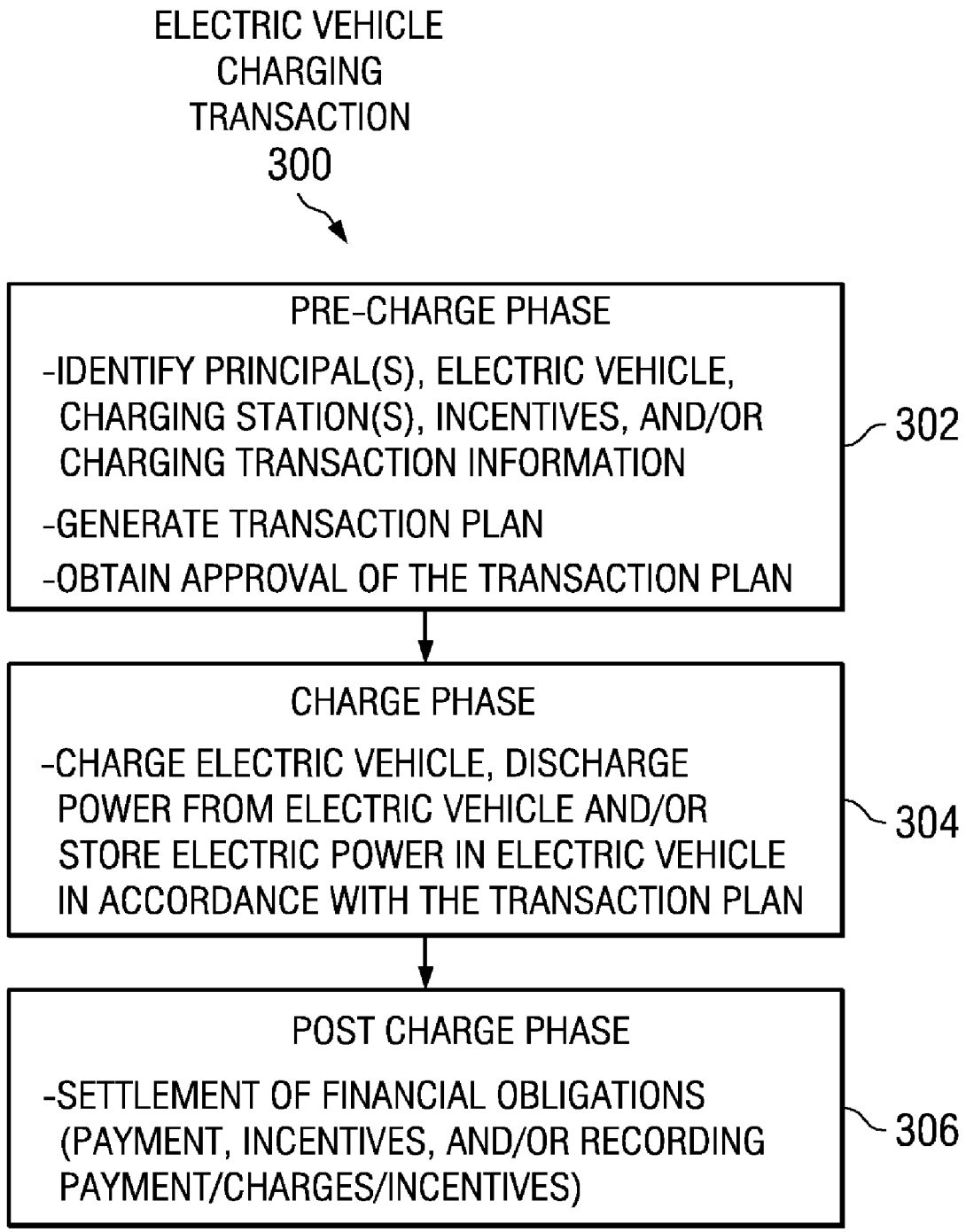
FIG. 3 is a block diagram illustrating phases of an electric vehicle charging transaction in accordance with an illustrative embodiment.

FIG. 3 is a block diagram illustrating phases of an electric vehicle charging transaction in accordance with an illustrative embodiment. Electric vehicle charging transaction 300 comprises pre-charge phase 302, charge phase 304, and post-charge phase 306. During pre-charge phase 302 the charging transaction interface identifies a set of one or more principals associated with the electric vehicle charging transaction. Each principal in the set of identified principals is an entity having an interest in the charging transaction for the electric vehicle. A charging transaction is a transaction associated with at least one of charging the electric vehicle, storing electric power in an electric storage mechanism associated with the electric vehicle, and de-charging the electric vehicle. The electric vehicle is identified by the charging transaction interface. The electric vehicle may be identified using a vehicle identification number (VIN) or any other type of identifier. The charging transaction interface may also identify one or more charging stations within a given vicinity of the electric vehicle, a charging station at which the electric vehicle is docked or connected, available incentives, and/or charging transaction information. The charging transaction information may include, without limitation, a set of preferences for the set of principals, information describing the capabilities of devices associated with the electric vehicle and/or the charging station(s), and/or information describing the current state of devices associated with the electric vehicle and/or the charging station(s).

During pre-charge phase 302 all parties are presented with the conditions governing the charging transaction and agree to the conditions relevant to their role in the charging transaction prior to the charge phase commencing. There may be special circumstances in the terms and conditions which should be presented in standard formats that are universally understood and which can be readily communicated and agreed upon by all parties.

During pre-charge phase 302 an energy transaction plan is generated to manage the aspects of the charging transaction. If approval of the transaction plan is needed, the charging transaction interface also obtains approval of the transaction plan during pre-charge phase 302. Thus, during pre-charge phase 302 of decision enablement, a charging plan is generated and all parties are presented with the conditions governing the charging transaction.

During charging phase 304, electricity flows to the electric vehicle, electricity flows from the electric vehicle, and/or electricity is stored in the electric vehicle for some period of time. Operational and financial parameters may be conveyed for an optimum charge transaction. A dynamic representation of an electric vehicle's capability to consume charge may be monitored at all time during charge phase 304 to ensure the electric vehicle is not harmed or that the protections of the charging system are preserved. Electricity metering of power flow may be conducted and reported. Standards representing acceptable charging voltage and amperage ranges, for example, may be communicated and maintained for a safe charging transaction to occur.

Finally, during post-charge phase 306 of the transaction, the charging transaction interface performs an analysis to settle the financial obligations of the principals and apply any applicable incentives on the part of one or more principals involved in the transaction. Post-charge phase 306 may include payment to one or more principals, applying incentives to the current transaction, issuing coupons, credits, gift cards, or other incentives to be used in the future, and/or recording the payments, charges, and incentives. All data pertinent to the financial transaction is conveyed and recorded.

Various programs may be available to encourage specific behaviors on the part of consumers. For example, there may be reduced electricity rates available if the electric vehicle charging is conducted during off-peak times when electricity usage across the power grid is lower. Data pertinent to these programs may be authenticated, accumulated, and analyzed for more effective business processing.

Figure 4:
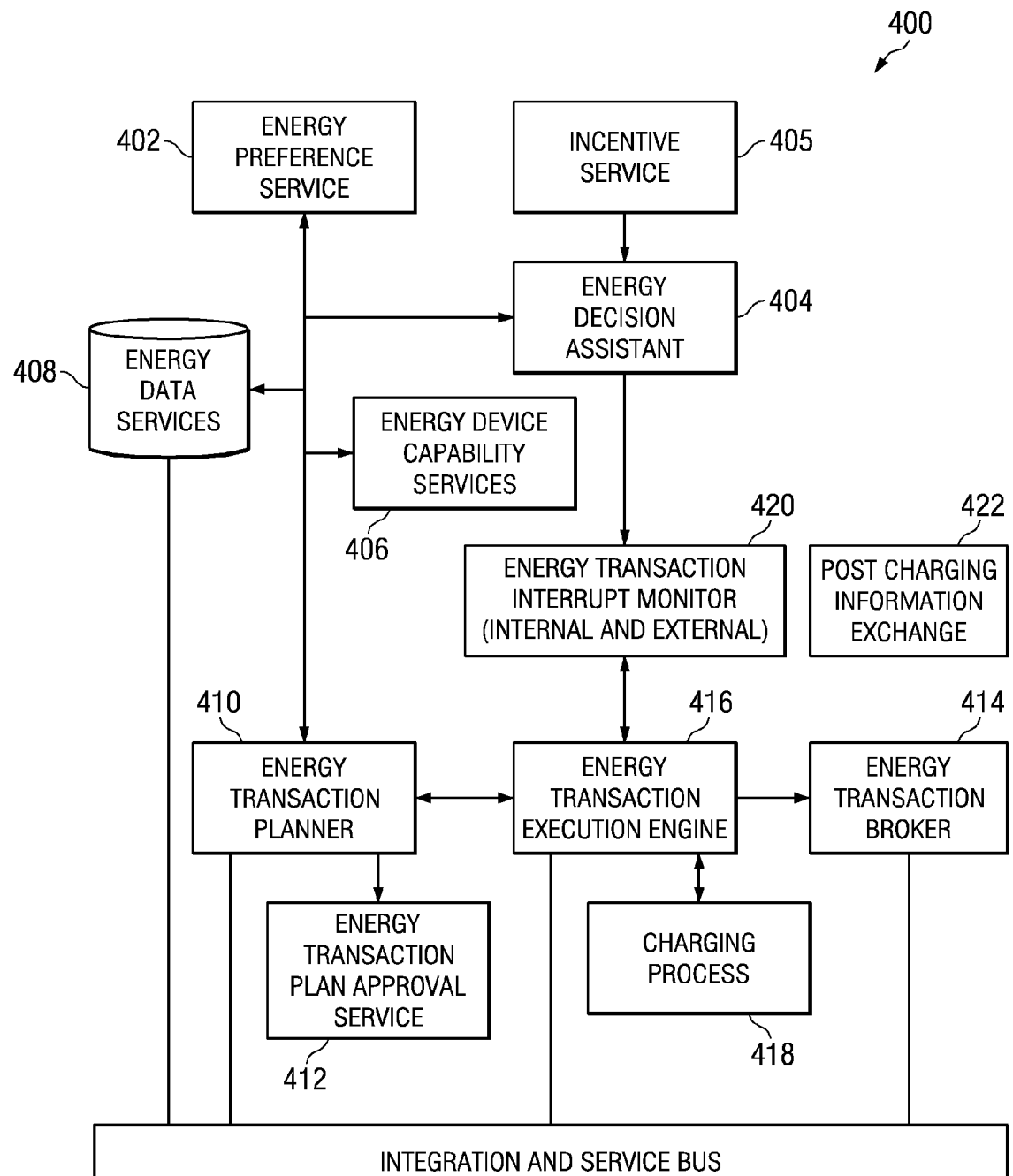
FIG. 4 is a block diagram of an energy transaction infrastructure in accordance with an illustrative embodiment.

FIG. 4 is a block diagram of a charging transaction interface infrastructure in accordance with an illustrative embodiment. Electric vehicle charging transaction interface infrastructure 400 is an infrastructure for managing all phases of an electric vehicle charging transaction. During the pre-charge phase, all parties of the transaction are presented with the conditions governing the charging transaction. The parties may include, without limitation, the owner of the electric vehicle to be charged, the operator of the electric vehicle, the owner of the charging station, and an electric utility company providing electricity to an electric power grid associated with the charging station. Parties agree to conditions relevant to their role in the transaction prior to the charge commencing. There are likely to be many special circumstances in the terms and conditions which are presented in standard formats which are universally understood and which can be readily communicated and agreed upon by all parties.

During the pre-charge phase, electric vehicle energy transaction infrastructure 400 utilizes energy preference service 402, energy decision assistant 404, incentive service 405, energy device capability services 406, energy data services 408, energy transaction planner 410, and optionally, energy transaction plan approval service 412 to generate a plan governing the charging transaction to the parties involved in the transaction.

Energy preference service 402 is a software component that generates, stores, and retrieves preference information associated with an electric vehicle and the preference information associated with the parties to the transaction. Preferences may include, without limitation, a maximum price per kilowatt hour of electricity to be paid by a party, a location where charging may occur, a location where charging may not occur, a rate of charging the electric vehicle, a minimum amount of charge, or any other preferences associated with charging an electric vehicle. The preferences may be pre-generated by one or more of the parties to the transaction.

Energy decision assistant 404 is an optional service that provides real-time options and trade-offs for a particular trip. For example, energy decision assistant 404 may monitor available incentives, weather conditions, a travel route, traffic information, and other real-time data to identify the best electric vehicle charging options for a particular trip.

Incentive service 405 receives offers of incentives from third party vendors. The incentives may be offers of discounts, rebates, rewards, and/or other incentives associated with charging an electric vehicle to encourage an operator of the electric vehicle to perform one or more behaviors associated with charging the electric vehicle. For example, and without limitation, an incentive may offer to charge the electric vehicle for free at a particular charging station if the owner or operator of the electric vehicle purchases one or more products from the third party vendor. Incentives service 405 provides information describing current incentives to energy transaction planner 410. In one embodiment, incentives service 405 provides the information describing the incentives to energy decision assistant 404. Energy decision assistant 404 then provides the incentives information to energy transaction planner 410.

Energy device capability service 406 is a software component that identifies and validates device capabilities. For example, and without limitation, energy device capability service 406 may include information describing the charging capabilities of the charging station, the charging requirements of the electric vehicle, the maximum storage capacity of the electric vehicle's on-vehicle storage mechanisms, the existing amount of charge in the electric vehicle, the number of amps of electricity the charging station is capable of providing, and any other information associated with the capabilities and requirements of the electric vehicles and the charging station.

Energy data services 408 are a set of one or more third party data sources providing information relevant to the energy transaction. Energy data services 408 may include, without limitation, weather information sources, traffic information sources, map and travel information sources, charging station price information sources, or any other third party information sources.

Energy transaction planner 410 is an application that creates a transaction plan for governing the electric vehicle charging transaction based on preferences of one or more principals. Energy transaction plan approval service 412 approves the transaction plan and validates with energy transaction broker 414. Energy transaction plan approval service 412 may be required to notify one or more parties of the terms of the transaction and obtain approval of one or more of the terms from the party. For example, and without limitation, if an operator of the electric vehicle is not the owner of the electric vehicle, energy transaction plan approval service 412 may require approval from the owner of the vehicle before allowing the vehicle to receive power at a charging station if the charging station and/or a utility will charge the owner of the electric vehicle a fee for the charging transaction. If approval is required, energy transaction planner 410 sends the transaction plan to energy transaction plan approval service 412. If energy transaction plan approval service 412 sends an approval back to energy transaction planner 410, the transaction plan is an approved transaction plan that is ready to be sent to execution engine 416 for execution.

In this example, the charging phase begins when energy transaction execution engine 416 receives the transaction plan generated by energy transaction planner 410 and a request to begin charging the electric vehicle. Energy transaction execution engine 416 monitors and logs the health and safety of charging process 418 and receives requests from energy transaction interrupt monitor 420. During charging process 418, electricity flows into the electric vehicle or out of the electric vehicle and back into the power grid. Energy transaction interrupt monitor 420 monitors data transmissions to detect interrupt conditions that may terminate the flow of electric power to or from a vehicle. The interrupts may originate from the power grid, suppliers, and/or vehicles. For example, if a price of energy exceeds a predefined threshold in violation of a user-selected preference, energy transaction interrupt monitor 420 detects this interrupt condition and initiates appropriate actions to handle the cessation of electric power flow to the electric vehicle.

The post-charge phase includes payment of the appropriate parties for the energy transaction in accordance with the energy transaction plan governing the transaction. Energy transaction broker 414 supports settling an electric vehicle charging and discharge transaction independent of electricity supplier, parking space supplier, electrical infrastructure supplier, taxing authority, incentive provider, or other interested party. Elements include pricing schedules, time based pricing, facility recovery, tax collection, incentives, and/or fixed plans. Energy transaction broker 414 may also be used by energy transaction approval service 412 to validate the financial elements of the energy transaction plan prior to plan approval and prior to charging the electric vehicle.

The post-charge phase may also optionally include analysis of the completed energy transaction to provide incentives, redeem credits or benefits, and induce specific behaviors by one or more parties involved in the charging transaction. Various programs may be available to encourage specific behaviors on the part of consumers. For example, a vehicle owner or user may receive reduced electricity rates if vehicle charging is conducted during off-peak times, such as during the night rather than during daylight hours when electricity usage is higher. Post charging information exchange 422 accumulates data pertinent to these incentives or redemption programs, authenticates the incentives data, and analyzes the incentives data to identify the most effective business process and optimize incentives for the parties.

During this charging phase, payment or fees for the charge are also recorded. Operational and financial parameters are conveyed for an optimum charge to occur. For example, a dynamic representation of an electric vehicle's capability to consume charge should be understood at all times during the charging process to ensure the vehicle is not damaged or that the protections of the charging system are preserved. Electricity metering of the power flow may also be conducted and reported. Standards representing the acceptable charging voltage and amperage ranges, for example may be communicated and maintained for a safe charging transaction to occur. All data pertinent to the financial transaction is conveyed and recorded.

The components shown in FIG. 4 may be implemented on a data processing system associated with an electric vehicle. In such case, the components communicate and transfer data using integration and service bus 424. Integration and service bus 424 is an internal communication system within the electric vehicle, such as any wired or wireless communications system. A wired communications system includes, without limitation, a data bus or a universal serial bus (USB). If one or more components shown in FIG. 4 are located remotely, the components may transfer data using any type of wired or wireless network connection to connect to a network, such as network 102 in FIG. 1. A wireless network connection may be implemented over a cell-phone network, satellite, two-way radio, WiFi networks, or any other type of wireless network.

Additional charging infrastructure may also be provided to meter electricity at the point of charge, identify the various parties involved in the transaction, and provide flexible business rules governing the flow of funds between those parties.

Figure 5:
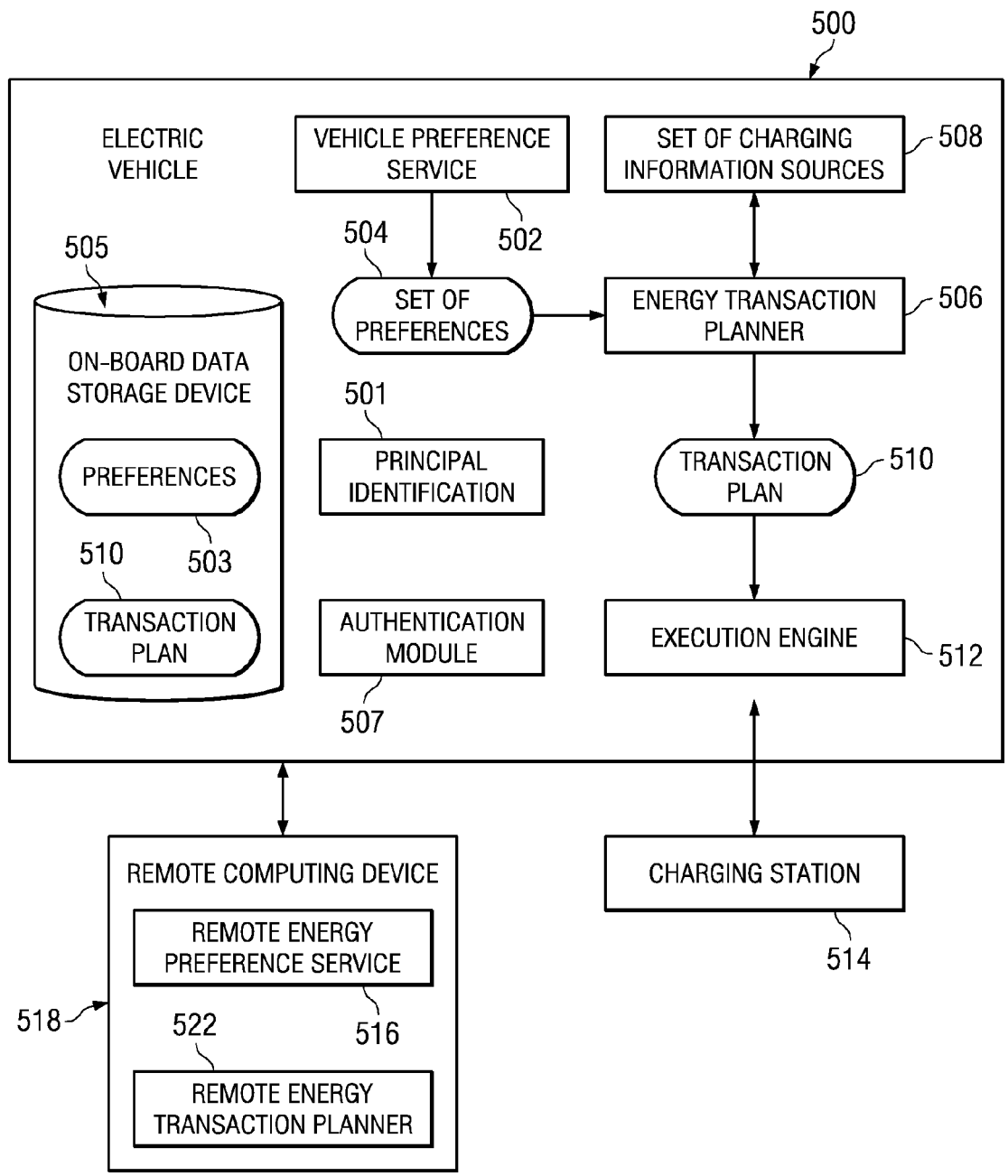
FIG. 5 is a block diagram illustrating a pre-charge phase of a charging transaction in accordance with an illustrative embodiment.

Turning now to FIG. 5, a block diagram illustrating a pre-charge phase of a charging transaction is shown in accordance with an illustrative embodiment. Electric vehicle 500 is an electric vehicle that relies in whole or in part on electricity to drive the vehicle, such as, without limitation, electric vehicle 116 in FIG. 1.

Principal identification 501 includes software and/or hardware to identify a principal associated with electric vehicle 500. Principal identification 501 may include a badge reader, a radio frequency identification tag reader, a biometric device, a prompt requesting a password and/or user login, or any other type of identification mechanism. The biometric device may include, without limitation, a fingerprint scanner, a thumbprint scanner, a palm scanner, a voice print analysis tool, a retina scanner, an iris scanner, a device for reading deoxyribonucleic acid (DNA) patterns of the user, or any other type of biometric identification device.

Likewise, the identification of the user may include, without limitation, a user name, a password, a personal identification (PIN) number, an identifier, a fingerprint, a thumbprint, a retinal scan, an iris scan, or any other type of identification. The identification is associated with the set of preferences to map the set of preferences with the identification of the user that created the set of preferences. In another embodiment, security authentication, authorization, and/or identification information for the principal's identity may also be provided. The identification of the principal may also be accomplished via the driver preference settings available on electric vehicle 500.

Vehicle preference service 502 is a software component for creating, managing, storing, and retrieving preferences for one or more principals, such as energy preference service 402 in FIG. 4. In this example, vehicle preference service 502 is included within or bolted on electric vehicle 500. Vehicle preference service 502 may be a system incorporated within electric vehicle 500 or added onto electric vehicle 500 as an after-market component. Vehicle preference service 502 responds to user input and requests or prompts users to enter preferences 503 through a user input/output device, such as without limitation, a graphical user interface, a command line interface, a menu driven interface, a keyboard, a mouse, a touch screen, a voice-recognition system, or any other type of input/output device. Vehicle preference service 502 may request an identity of a principal using the user input/output device. Vehicle preference service 502 may also obtain the identity of the principal from principal identification 501.

Preferences 503 are choices for managing, governing, and/or controlling the manner in which electric vehicle 500 is charged with electric power at charging station 514, de-charged, or used for storage of electric power. De-charging refers to removing or drawing electric power from electric vehicle 500 and returning the electric power to a power grid. A preference specifies a parameter of the charging transaction that is to be minimized, maximized, or optimized. A parameter of the charging transaction is any feature of the charging transaction, such as, without limitation, a rate of charging, a length of time for charging, a time to begin charging, a time to cease charging, a maximum level of charge, a minimum level of charge, or any other aspect of the charging transaction.

It will be appreciated by one skilled in the art that the words "optimize", "optimization" and related terms are terms of art that refer to improvements in speed, efficiency, accuracy, quality, and/or improvement of one or more parameters of electric vehicle charging transactions, and do not purport to indicate that any parameter of the charging transaction has achieved, or is capable of achieving, an "optimal" or perfectly speedy, perfectly efficient, and/or completely optimized.

Each preference may optionally be associated with a weighting value. For example, a preference may specify that charging at charging stations that obtain power from environmentally friendly, "green", wind farms is to be maximized or given a higher weighting value while charging at charging stations that obtain power from "brown", coal powered plants that may be harmful to the environment and should be minimized or given a lower weighting value. Brown energy refers to power generated from polluting sources, as opposed to green energy that is produced from renewable or less polluting energy sources.

Preferences 503 may also specify the price per kilowatt hour the user is willing to pay to charge the electric vehicle, identify certain charging stations the user prefers to fully charge electric vehicle 500 and identify other charging stations at which the user prefers to partially charge electric vehicle 500, perhaps due to proximity to the user's home or due to the source of the electricity. For example, preferences may indicate that charging when the price per kilowatt hour is less than thirteen cents is to be maximized and charging when prices are higher than thirteen cents per kilowatt hour is to be minimized or prohibited all together. In another example, preferences 503 may specify a limit, such as, without limitation, buy electricity up to a certain price or optimize the cost of the return trip home given the current prices of gas and electricity.

Preferences 503 may be static, dynamic, or temporary preferences. A static preference, also referred to as a default preference, is a preference that is effective until the user changes the preference. A dynamic preference is a preference that does not have a predetermined value. A dynamic preference requires a user to enter a value for the dynamic preference in real time as the set of preferences are needed for a particular charging transaction. Thus, if a preference specifying whether an operator of the vehicle is to be allowed to charge electric vehicle 500 is a dynamic preference, the principal is always prompted to enter a preference value indicating whether a particular operator of electric vehicle 500 is authorized to charge electric vehicle 500. A user may choose to make a preference for operator charging electric vehicle 500 a dynamic preference so that the owner of electric vehicle 500 will always be informed of who is attempting to charge electric vehicle 500 and have the option of preventing the charging of electric vehicle 500 in real time prior to commencing of the charging transaction.

A temporary preference is a preference that is only valid for a predetermined period of time, a predetermined number of transactions, or under predetermined conditions. When the period of time expires or the number of transactions is used, the temporary preference is invalid and no longer used. For example, a user may set a temporary preference that indicates no charging is to be performed for the next ten minutes at the charging station where the user is parked because the user is only going to be parked for five minutes. At the end of the ten minute time period, the temporary preference expires and electric vehicle 500 can begin charging if electric vehicle 500 is still parked at the charging station.

Preferences 503 are preference selections chosen by one or more users. A set of preferences may be stored for each user in a plurality of principals. For example, if electric vehicle 500 is owned and operated by a single person, preferences 503 may only contain a set of preferences for the person that is the owner and operator. However, if electric vehicle 500 is owned by a company that frequently loans electric vehicles to employees, preferences 503 may include a set of preferences for the owner and a set of preferences for each employee that borrows electric vehicle 500. In such a case, vehicle preference service 502 may create, store, and manage hundreds of sets of preferences for hundreds of principals.

Vehicle preference service 502 stores preference 503 selected by one or more principals in data storage device 505. Data storage device 505 may be implemented as any type of known or available device for storing data, such as, without limitation, a hard drive, a flash memory, a main memory, read only memory (ROM), a random access memory (RAM), a magnetic or optical disk drive, tape, or any other type of data storage device. Data storage may be implemented in a single data storage device or a plurality of data storage devices. In this example, data storage device 505 is located on-board electric vehicle 500. However, data storage device 505 may also be located remotely from electric vehicle 500 or on a removable data storage device.

Vehicle preference service 502 receives requests for set of preferences 504 from energy transaction planner 506. Set of preferences 504 is a set of preferences of interest in a particular charging transaction. Energy transaction planner 506 is a component for generating an energy transaction plan to manage the charging of an electric vehicle connected to an electric grid in accordance with the preferences of one or more parties to the electric vehicle charging transaction, such as energy transaction planner 410 in FIG. 4.

When energy transaction planner 506 is engaged to create a transaction plan to govern an electric vehicle charging transaction for electric vehicle 400, energy transaction planner 506 sends a request that contains at least the identity of one or more principals and a description of the specific preferences that are required by energy transaction planner 506. For example, energy transaction planner 506 may only need charging related preferences if the charging station is incapable of providing discharge or store services. The messages sent between vehicle preference service 502 and energy transaction planner 506 may be authenticated and/or encrypted by authentication module 507.

Authentication module 507 comprises any type of known or available encryption technology and/or security protocols, such as, without limitation, public/private key exchange. Authentication module 507 may be used to authenticate vehicle preference service 502 itself or authenticate tokens provided by vehicle preference service 502 for each of the principals for which vehicle preference service 502 is providing preferences to energy transaction planner 506.

In response to receiving the request from energy transaction planner 506, vehicle preference service 502 retrieves the one or more preferences in set of preferences 504 from the plurality of preferences stored in data storage device 505 that are responsive to the request.

Energy transaction planner 506 also requests other charging information from set of charging information sources 508. Set of charging information sources may include, without limitation, an energy device capability service, such as energy device capabilities services 406 in FIG. 4, and/or an energy data service, such as energy data services 408 in FIG. 4. The charging information may include information describing the capabilities of devices and/or current state of devices associated with electric vehicle 400 and/or charging station 514, as well as any other information relevant to the charging transaction. Energy transaction planner 506 utilizes set of preferences 504 and/or any other available charging information from set of charging information sources 508 to generate transaction plan 510. Energy transaction plan 510 is then sent to execution engine 512 for implementation during the charging phase of the charging transaction. Energy transaction planner 506 may also save a copy of transaction plan 510 in data storage device 508.

Energy transaction plan 510 is a plan that manages every aspect of charging electric vehicle 500, using electric vehicle 500 as a temporary electric storage device, discharging/selling electric power back to the electric grid, or any combination of charging, de-charging, or storing. For example, and without limitation, energy transaction plan 510 may involve charging electric vehicle 500 for two hours, storing the electricity for one hour, de-discharging/selling electricity back to the grid for thirty minutes, waiting two hours and then charging again for one more hour.

Energy transaction plan 510 is created to meet the needs of all the identified principals, is consistent with the capabilities of the physical components of electric vehicle 500, charging station 514, and the electric power grid. Charging station 514 is a station or kiosk for permitting electric vehicle 500 to connect to an electric grid to charge or de-charge electric vehicle, such as charging station 118 in FIG. 1.

To construct energy transaction plan 510, a number of the following entities should be specified: a user paying for the charging transaction, the electric vehicle to be charged, the electric vehicle owner, the supplier of electricity, such as a utility, the owner of the charging station or outlet, and additional information related to incentives or credits, such as, for example, a clean energy generation source. In addition, energy transaction plan 510 optionally determines the contractual relationships between all principals. Energy transaction plan 510 includes an identification of electric vehicle 500, an identification of the principal paying for the charging and/or the principal that is to be paid for storing electric power or de-charging electric vehicle 500. Energy transaction plan 510 may specify method of payment, amount of payment, incentives, terms of the transaction, and enforcement of the terms of the charging transaction.

In this example, energy transaction planner 506 obtains set of preferences 504 from vehicle preference service 502 that is located on-board electric vehicle 500. However, energy transaction planner 506 may optionally receive some preferences, or all preferences, from one or more remote energy preference services, such as remote energy preference service 516 on remote computing device 518. Likewise, in the example shown in FIG. 4, energy transaction planner 506 is an on-vehicle component that is attached, coupled to, or located on electric vehicle 500. However, in another embodiment, vehicle preference service 502 may receive requests for preferences from remote energy transaction planner 522 that is located on remote computing device 518 that is remote from electric vehicle 500. Electric vehicle 500 communicates with remote energy preference service 516 and/or remote energy transaction planner 522 on remote computing device 518 over a network via a network interface. The network interface is any type of network access software known or available for allowing electric vehicle 500 to access a network, such as network 102 in FIG. 1. Vehicle preference service 502 utilizes the network connection to send set of preferences 504 to remote energy transaction planner 522 on remote computing device 518. Likewise, energy transaction planner 506 may use the network connection to request preferences from one or more remote energy preference services.

A secure connection may be established between electric vehicle 500 and remote computing device 518 using any wired or wireless communications method, such as, without limitation, Wi-Fi, Bluetooth, telephone network, or any other network connection. The remote computing device 518 may be any type of computing device, such as, without limitation, a desk top computer, a laptop computer, a personal digital assistant (PDA), or a smart phone.

Figure 6:
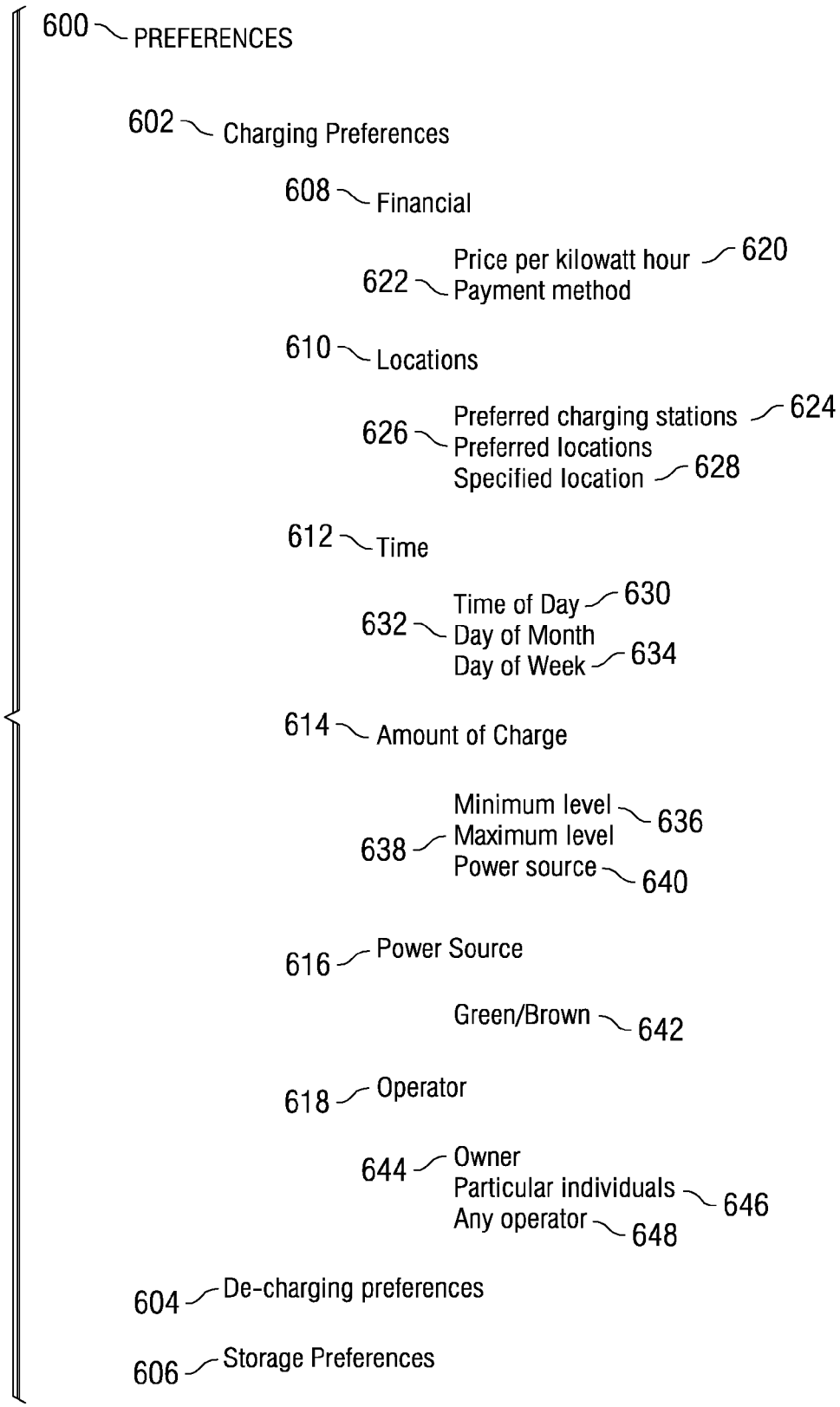
FIG. 6 is a block diagram of vehicle preferences in accordance with an illustrative embodiment.

Referring to FIG. 6, a block diagram of vehicle preferences is shown in accordance with an illustrative embodiment. Preferences 600 are types of preferences that may be included within preferences for one or more users, such as preferences 420 in FIG. 4. Preferences 600 may be charging preferences 602 for governing energy transaction to charge an energy storage device associated with the electric vehicle, de-charging preferences 604 for governing energy transactions for de-charging or depleting the energy stored in an energy storage device, or storage preferences 606 for governing the storage of electricity in the electric vehicle's energy storage mechanisms.

A user may wish to de-charge or transfer power from the electric vehicle to a charging station if the price of the electricity is higher than when the electricity was purchased and stored in the electric vehicle. For example, if a user charges an electric vehicle at night when the price of the electricity is only nine cents per kilowatt hour, the user may wish to de-charge or provide electricity from the electric vehicle back to the charging station at noon when the price per kilowatt hour is fifteen cents because the user is able to make a profit from storing the electricity in the electric vehicle until the price of electricity increases and then selling the electricity back to the electric grid.

Some examples of charging preferences include, without limitation, financial 608, locations 610, time 612, amount of charge 614, power source 616, and/or operator 618. For example, financial 608 preferences may specify price per kilowatt hour 620 that the user is willing to pay to charge the electric vehicle or payment method 622 for purchasing the electricity from the charging station and/or the electricity grid. Payment method 622 may include, without limitation, credit cards, cash, debit card, credit, or any other type of payment. The payment type preferences may even specify a particular credit card or bank account for debit to pay for the charging transaction.

Locations 610 preferences may specify preferred charging station 624, preferred locations 626 of the charging stations, and/or specified locations 628 for charging. For example, the user may specify that any time the electric vehicle is parked at a charging station that is at a specified location, the electric vehicle is not to be charged at all, to be charged to a particular charge level, or to be fully charged. The user may wish to set these preferences because the charging stations are a given distance from the user's home or workplace, due to past service received at the charging station, or any other factors.

Time 612 preferences may specify, without limitation, time of day 630 for charging the vehicle, time of day to stop charging the vehicle, day of month 632 for charging, and/or day of the week 634 for charging the electric vehicle.

Amount of charge 614 preferences may specify minimum level 636 of charge in the electric vehicle's storage device, a maximum level of charge 638, or specify different levels of charge depending on power source 640 of the electricity used to charge the electric vehicle. If the power source is a "green" source, such as solar power, the user may specify a higher charge level than if the power source is a more environmentally harmful, or "brown" power source, such as coal or oil.

Power source 616 preferences specify types of power sources that are acceptable or preferred and/or provide weighting values for different power sources. The power sources may be identified as "green" or "brown" 642. The power sources may also be identified specifically by the type of power source, such as wind, solar, coal, oil, and so forth.

Operator 618 preferences are preferences for allowing particular operators to charge the electric vehicle. Owner 644 is a preference that permits an owner to charge, particular individuals 646 permits identified individuals to charge the vehicle, and any operator 648 is a preference that permits anyone to charge the electric vehicle. The operator 618 preference may permit a user to prevent or impede theft of the electric vehicle. For example, if a user sets owner 644 as a mandatory preference that only permits the owner to charge the electric vehicle, a thief would not be permitted to recharge the electric vehicle. Therefore, a thief may not be able to transport the electric vehicle very far from the location at which the electric vehicle was stolen.

The preferences described for charging preferences 602 are only examples of some preferences that may be used. A vehicle preference service is not required to utilize all of the preferences shown in FIG. 6. Moreover, a vehicle preference service may utilize other preferences not shown in FIG. 6 without departing from the scope of the embodiments. Finally, the preferences shown for charging preferences 602 may also be used as preferences for de-charging preferences 604 and/or storage preferences 606, in addition to other preferences not shown. For example, de-charging preferences 604 may include operator 618 preferences specifying operators that are permitted to de-charge or sell power back to the electric grid, financial 608 specifying prices at which the electricity may be transferred from the electric vehicle and sold back to the electric grid, time 612 when de-charging may occur, amount of charge 614 levels for de-charging, and power source 616 of the power that is de-charged.

FIG. 7 is a block diagram of preference settings in accordance with an illustrative embodiment. Preference settings 700 are settings that may be appended to a preference, such as preference A 702. Preference A 702 may be any type of preference, such as, without limitation, financial, locations, time, amount of charge, power source, operator, or any other preferences. Mandatory 704 specifies that the requirements of a particular preference must be met or a charging transaction will not be permitted. For example, if a user sets an operator preference indicating that only the owner is permitted to charge the electric vehicle and the user sets the preference to mandatory, only the owner will be permitted to initiate charging of the electric vehicle. Any other operator of the electric vehicle will not be permitted to charge the electric vehicle unless the owner changes the preference settings.

Optional/weighted 706 is a setting that indicates that a preference is preferred or desirable, but not mandatory. For example, the user may specify that "green" power sources, such as wind and solar power sources, are preferred but not mandatory. In such cases, the energy transaction planner may still permit charging of the electric vehicle at charging stations that utilize electricity provided by coal powered electric generators. The weighting value permits a user to indicate how strongly the user wants a particular preference to be minimized, maximized, or optimized. In the example above, the user may indicate a high weighting value in favor of wind and solar power, a medium weighting value for nuclear power plants, and a low weighting value for coal power plants. The energy transaction planner may then use the weighting value to determine how much to charge or de-charge the electric vehicle or whether to charge or de-charge the electric vehicle at all.

Static 708 indicates that a preference is a default preference that should be used in all cases. A static preference does not change from one charging transaction to the next charging transaction. Dynamic 710 setting indicates that a user wants to provide or select a value or choice for this preference every time a charging transaction plan is generated. A dynamic preference is selected in real time as the charging transaction is commencing. Temporary 712 indicates that a temporary preference value is to be used in place of a static preference for a limited period of time. For example, a user may wish to override a static preference that the electric vehicle should always be fully charged at a particular charging station with a temporary preference indicating that the electric vehicle is not to be charged because the user will only be parked at the charging station for a few minutes.

Turning now to FIG. 8, a block diagram of parties to an electric vehicle charging transaction is depicted in accordance with an illustrative embodiment. Each party may have a set of preferences for charging the electric vehicle that is managed by the vehicle preference service. A principal is any entity that may have an interest or role in the energy transaction for charging an electric vehicle, including but not limited to, the vehicle operator, owner of the electric vehicle, the owner of the charging station, the operator of the charging station, financial institutions associated with one or more of the parties, utilities associated with one or more of the principals, or third parties having an interest in the charging transaction. FIG. 8 illustrates the different relationships between principals. Any one or more of the principals shown in FIG. 8 may have preferences stored in the on-vehicle preference service.

Electric vehicle 800 is a vehicle that relies in whole or in part on electric power to drive the vehicle, such as electric vehicle 118 in FIG. 1 or electric vehicle 400 in FIG. 4. Owner of electric vehicle 802 is a principal that creates a set of preferences in vehicle preference service on electric vehicle 800. Operator of electric vehicle 804 is a principal that may be the owner or only someone that has borrowed electric vehicle 800. Each operator may optionally create their own set of preferences in the vehicle preference service on electric vehicle. Charging station 806 is a station or kiosk at which electric vehicle obtains charge or de-charges to provide electricity back to the electric grid, such as charging station 118 in FIG. 1 or charging station 514 in FIG. 4. Charging station 806 may also have a set of preferences for governing the charging of electric vehicle 800. Each party may have a utility associated with the party. A utility refers to a provider of electric power. A utility typically provides electric power to a charging station via an electric power grid. Each utility may also have preferences for governing the charging transaction. For example, utility of owner 808, utility of operator 810, and utility of charging station 812 may each be parties with an interest in the charging transaction and preferences for governing the charging of electric vehicle 800.

Each party may also have a financial institution for paying for the electricity purchased, or for being reimbursed for electricity provided back to the electric grid. A financial institution may be a bank, a credit card company, a broker, a lender, or any other financial institution. For example, financial institution A 814 may be associated with owner of electric vehicle 802, financial institution B 816 may be associated with operator of electric vehicle 804, and financial institution C 818 may be associated with charging station 806. Each of these financial institutions may have preferences for controlling how amounts due are received, how charges of payments are received and accepted, how credits are issued and received, and other aspects of financial transactions associated with charging electric vehicle 800.

Third party vendor 820 is a third party that is not associated with charging station 806 or electric vehicle 800. For example, and without limitation, third party vendor 820 may be a grocery store, a convenience store, a car wash, a repair shop, or any other type of vendor. Third party broker 822 is a third party that may provide financing or manage financial transactions associated with charging electric vehicle 800.

Each of the parties shown in FIG. 8 may optionally have preferences, constraints, limitations, or requirements associated with charging electric vehicle 800. The vehicle preference service on electric vehicle 800 may optionally store, manage, and retrieve some or all of these preferences, constraints, limitations, and requirements in data storage device on electric vehicle 800. The vehicle preference service retrieves the information of interest that is responsive to a request by an energy transaction planner and sends the preferences of interest to the energy transaction planner for use in generating a plan to govern the charging of electric vehicle 800 at charging station 806.

Figure 9:
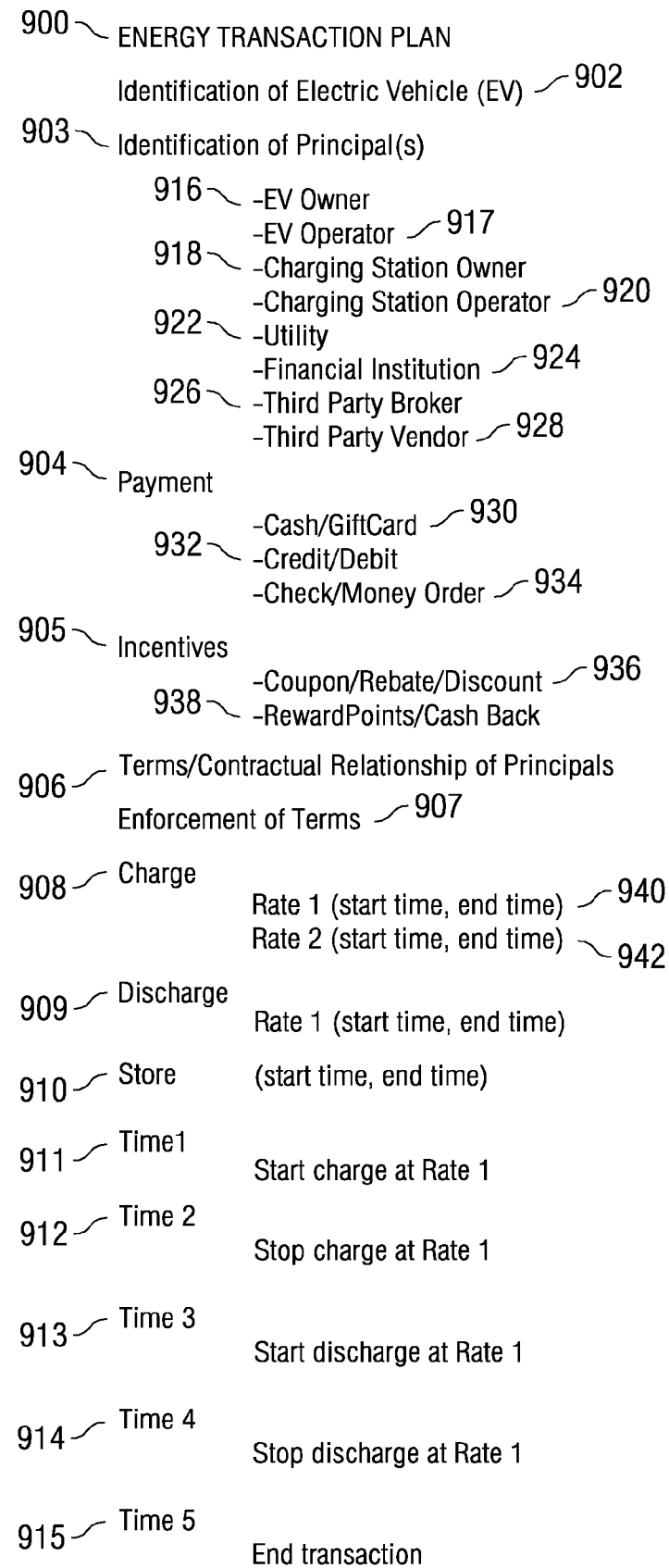
FIG. 9 is a block diagram of a set of fields in an energy transaction plan in accordance with an illustrative embodiment.

FIG. 9 is a block diagram of a set of fields in an energy transaction plan in accordance with an illustrative embodiment. Energy transaction plan 900 is a plan for managing an electric vehicle charging transaction, such as energy transaction plan 424 in FIG. 4. Energy transaction plan 900 defines an energy transfer transaction encompassing the charge, discharge, and storage of electric energy in an electric vehicle and the incumbent financial exchanges related to those energy exchanges and storage of electric power in the electric vehicle. Energy transaction plan 900 may include, without limitation, identification of electric vehicle 902; identification of principal(s) 903; payment 904 terms; incentives 905; terms/contractual relationship of the principals 906; enforcement of terms 907; charge 908, discharge 909, store 910, and/or a series of time fields indicating the electric flow direction at each time mark, such as, without limitation, time 1 911, time 2 912, time 3 913, time 4 914, and/or time 5 915.

Identification of principal(s) 903 identifies one or more principals for a particular charging transaction, such as, without limitation, electric vehicle (EV) owner 916; electric vehicle operator 917; charging station owner 918; charging station operator 920; utility 922 of the owner; operator; or charging station; financial institution 924 of the owner; operator; or utility; third party broker 926; and/or a third party vendor 928. Payment 904 may specify the type of payment method, such as, without limitation, cash/gift card 930; credit/debit 932; and/or check/money order 934. Incentives 905 are terms in energy transaction plan 900 associated with coupons/rebates/discounts 936, and/or reward points/cash back 938, or any other rewards, discounts, rebates, coupons, or other benefits.

Charge 908 orders the flow direction of electricity from the charging station into the electric vehicle during one or more specified time intervals. Rate 1 940 is a first time interval during which the electric vehicle receives electricity from the charging station at a specified rate of electricity flow. Rate 2 942 is a second time interval during which the electric vehicle receives electricity from the charging station at a specified rate. Discharge 909 indicates each time interval during which electricity flows out of the electric vehicle and back into the electric grid through the charging station. Store 910 indicates time intervals during which electricity is neither flowing into the electric vehicle nor flowing out of the electric vehicle's electricity storage mechanisms. In other words, during the one or more time intervals indicated in store 910, the electric vehicle stores electricity in the electric vehicle's storage mechanisms without charging or discharging power.

The time intervals 911-915 optionally indicate start and end times for charging, discharging, and/or storing. Energy transaction plan 900 may have multiple charge, discharge or store time windows. In this example, and without limitation, time 1 911 starts charging the electric vehicle at a given rate of electricity flow until time 2 912. At time 2 912, charging stops. At time 3 913, the electric vehicle begins discharging power back to the electric grid and continues discharging electricity until time 4 914. Time 5 915 indicates a time when the electric vehicle charging transaction ends. However, the embodiments are not limited to this example. The field for time 1 911 may have been an entry for discharging the electric vehicle instead of charging. The field for time 4 914 may be a field for storing electric power.

Fields 908-915 are examples of charging transaction time driven event sequences. The time intervals may be any standard clock time, such as Greenwich Mean Time, Central Time, Pacific Time, an internal clock time for the electric vehicle, or any other standard clock time. In another embodiment, the time may be a time relative to beginning the electric vehicle charging transaction. For example, instead of charge 908 stating that charging begins at 2:24 p.m. and ends at 4:24 p.m., charge 908 may state that charging begins when the charging transaction begins and ends two hours later, regardless of what time it may be.

Energy transaction plan 900 is not required to include every field shown in FIG. 9. For example, and without limitation, energy transaction plan 900 may include fields for charge 908, discharge 909, and store 910 but omit fields for time entries, such as time 1 to time 5 911-915. In addition, energy transaction plan 900 may include additional fields not shown in FIG. 9. For example, energy transaction plan may include a time 5 to begin storing electricity, time 6 to stop storing, time 7 to charge, time 8 to stop charging, time 9 to discharge, time 10 to stop discharging, and time 11 to end the transaction. In other words, energy transaction plan 900 may include any number of fields and any combination of fields to provide terms for charging, discharging, and/or storing electricity in an electric vehicle.

Figure 10:
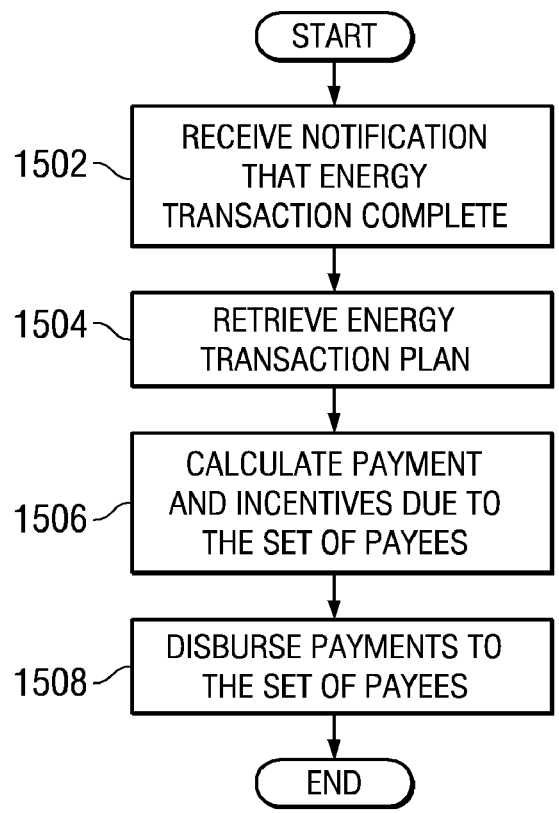
FIG. 10 is a block diagram of a set of fields in an energy transaction plan summary in accordance with an illustrative embodiment.

FIG. 10 is a block diagram of a set of fields in an energy transaction plan summary in accordance with an illustrative embodiment. Transaction plan summary 1000 is an example of fields that may be provided in a summary of a proposed energy transaction plan generated by an energy transaction plan approval service, such as plan summary 414 in FIG. 4. Battery charge at end of transaction 1002 is a field that summarizes the anticipated amount of charge in one or more electric power storage mechanisms on-board an electric vehicle at the end of an electric vehicle charging transaction. Net financial cost/gain 1004 is a field that provides an anticipated net cost for electric power or an anticipated net financial gain at the end of the electric vehicle charging transaction. A net financial gain may occur where the electric vehicle purchases electricity for storage on the electric vehicle when rates for electricity are low and then sells the electricity back to the power grid during peak electric power utilization when the price of electricity is higher.

A carbon cap and trade system is a system in which those who produce carbon emissions below a certain level obtain carbon credits that may then be sold to those who produce carbon emissions above that level. Carbon cap and trade net transaction 1006 is a field indicating the amount of carbon credits that may have been earned. Net transaction result for other commodities 1008 is a field for indicating net gains or losses associated with other commodities. For example, net transaction result for other commodities 1008 may indicate a number of reward points earned by the user, discounts on other commodities such as car wash, oil change, or other vehicle maintenance privileges, reduction of parking fees, or other commodities. Rating 1010 indicates a rating for certain goals of a user. For example, carbon footprint 1012 rating indicates how well the electric vehicle's carbon emissions rate on a carbon footprint scale. Financial goals 1014 indicates a rating for how the actual financial costs/gains of the electric vehicle charging transaction(s) rate in accordance with the user's selected preferences.

Transaction plan summary 1000 is only an example and not intended as a limitation. A transaction plan summary may include more fields than is shown in FIG. 10 or fewer fields than is depicted in FIG. 10.

Figure 11:
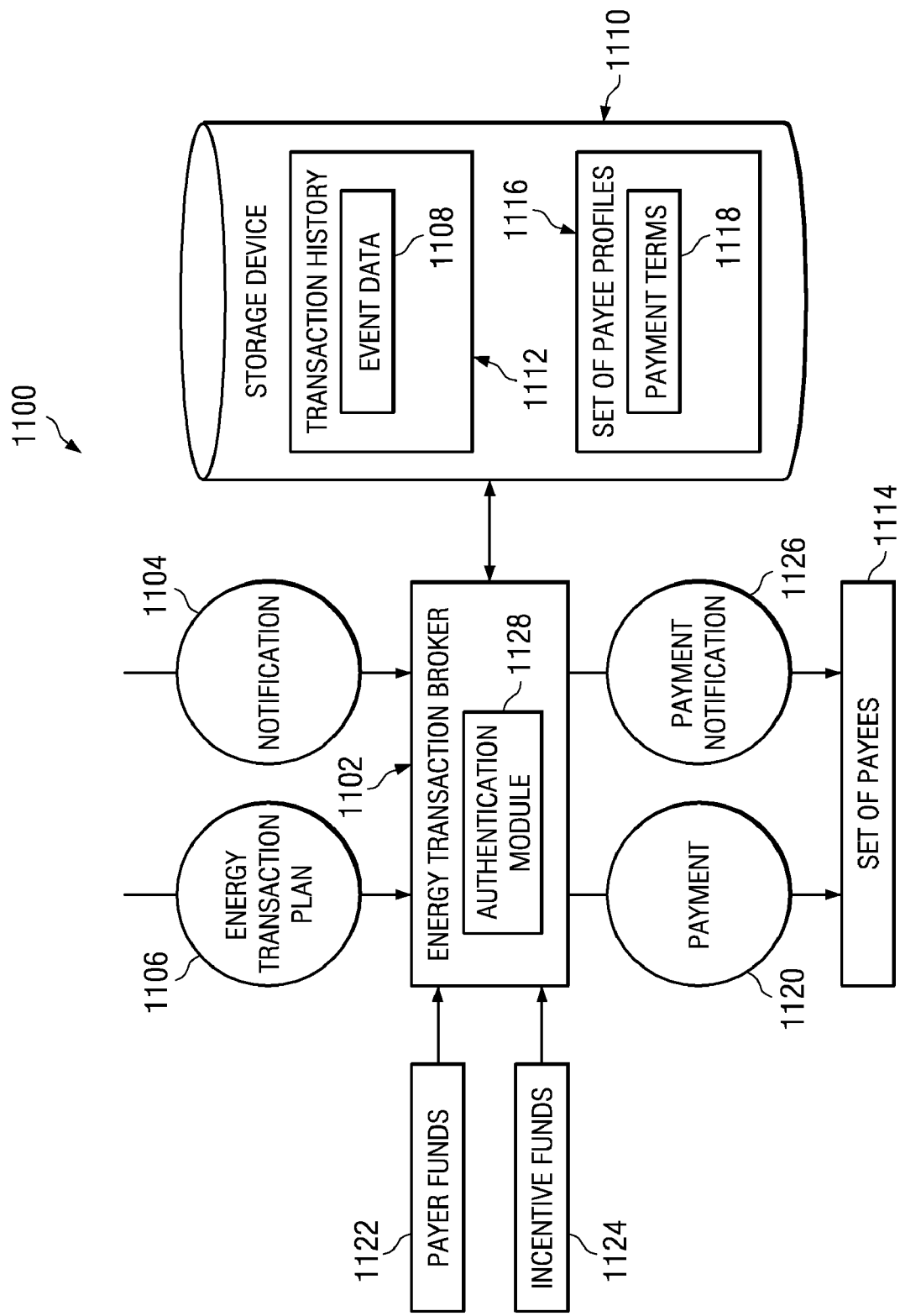
FIG. 11 is a block diagram of a post-charge process for brokering electric vehicle charge transactions in accordance with an illustrative embodiment.

FIG. 11 is a block diagram of a post-charge process for brokering electric vehicle charge transactions in accordance with an illustrative embodiment. Post charge system 1100 is a system for processing data, such as network data processing system 100 in FIG. 1 and electric vehicle charging transaction infrastructure 300 in FIG. 3.

Energy transaction broker 1102 is an energy transaction broker such as energy transaction broker 414 in FIG. 4. Energy transaction broker 1102 is configured for brokering settlement of payments in a charging transaction. The process of brokering the settlement of a charging transaction includes identifying a set of payees' entitled payment, calculating a payment owed, and disbursing the payment according to payment terms. In addition, the settlement process may require applying incentive funds to offset an amount owed by the party charging an electric vehicle.

Energy transaction broker 1102 initiates the settlement process in response to receiving notification 1104 indicating that a charging transaction has been completed. Energy transaction broker 1102 may receive notification 1104 from an execution engine, such as energy transaction execution engine 416 in FIG. 4. After receiving notification 1104, energy transaction broker 1102 retrieves energy transaction plan 1106. Energy transaction plan 1106 is a plan for controlling and managing multiple aspects of the charging transaction, such as transaction plan 510 in FIG. 5. Energy transaction plan 1106 may indicate the location of the charging station, the date of the charging transaction, a length of time that the electric vehicle was at the charging station, an amount of electricity that was transmitted between the electric vehicle and the charging station, the variable rate of the cost of electricity during the charging transaction, the utility provider responsible for providing electricity, and any other information that may be related to the charging transaction or relevant for brokering the settlement of a charging transaction.

Energy transaction broker 1102 extracts event data 1108 from energy transaction plan 1106. Event data 1108 may include, for example, unique identifiers included in energy transaction plan 1106, prices, quantities of energy transferred, or any other categories of information related to a charging transaction. Event data 1108 may be stored in storage device 1110 and aggregated over time. Storage device 1110 is a device for storing data. Storage device 1110 may include, for example, a hard drive, flash drive, remote server, or any other device for storing data.

Aggregated event data 1108 forms transaction history 1112. Transaction history 1112 is a collection of event data recorded over time. Transaction history 1112 may be used for auditing past charging transactions, or mined for relevant information for performing data analysis. The results of the data analysis may be used to provide incentives, recommendations for optimizing energy consumption, or other selected outcomes or tasks.

Event data 1108 may also be used for identifying set of payees 1114. Set of payees 1114 is one or more principals, such as, for example, a utility company, a point of service entity providing a charging station, a government entity specifying a tax applicable to a charging transaction, or any other party participating in a charging transaction. Set of payees 1114 may be identified from event data 1108 by correlating a unique identifier assigned to a payee with a payee profile from set of payee profiles 1116.

Set of payee profiles 1116 is one or more profiles corresponding to set of payees 1106. Each profile from set of payee profiles 1116 includes information relating to a single payee from set of payees 1114. Energy transaction broker 1102 may identify set of payees 1114 by correlating payee identifiers from event data 1108 with payee identifiers from profiles of set of payee profiles 1116. In this manner, energy transaction broker 1102 may quickly and easily locate information, instructions, or preferences that facilitate the settlement of a charging transaction for the benefit of each payee in set of payees 1114.

Set of payee profiles 1116 may also include payment terms 1118. Payment terms 1118 are terms to which a payee has agreed and which govern the settlement of a charging transaction. For example, payment terms 1118 may provide an algorithm for calculating the portion of payment 1120 due to the payee, establish the time and manner in which payment 1120 is made, or an account into which payment 1120 is deposited. Thus, if a payee is a government entity, payment terms 1118 may specify that payment 1120 is based on a rate of an excise tax applicable to all charging transactions.

Payment 1120 may be any medium of exchange, such as, without limitation, coins, paper money, demand deposits, credit, or other forms of money. Payment 1120 may be made with funds from payer funds 1122 and/or incentive funds 1124. Payer funds 1122 is a fund supplied by a payee, such as, without limitation, a bank account debit card, a check, money order, or some other acceptable form of payment. Incentive funds 1124 is a fund established by a payee or a third party entity. For example, without limitation, set of payees 1114 may include a point of service entity providing a charging station at which a charging transaction may occur. Incentive funds 1124 are applied to payment 1120 and reduce the amount of money that energy transaction broker 1102 uses from payer funds 1122.

After payment 1120 is made to set of payees 1114, energy transaction broker 1102 sends payment notification 1126 to set of payees informing set of payees 1114 that payment 1120 has been disbursed, thus signaling the completion of a charging transaction. Payment notification 1126 may provide details such as, for example, a time at which the disbursement was made, the account into which payment 1120 was deposited, a unique identifier associated with the user from which payer funds 1122 is associated, the amount of the disbursement, or any other relevant information. The payment notification 1126 may include an incentive for future use on a future charging transaction and/or an incentive offering other related or unrelated goods and services.

Authentication module 1128 is a software component for authenticating energy transaction plan 1106 using currently available or later developed authentication algorithms. Authentication module 1128 may also implement encryption technologies for protecting energy transaction plan 1106 or other forms of protected data. Authentication module 1128 insures that only those entities having the proper authorization receive payment 1120, payment notification 1126, or other forms of protected information.

Figure 12:
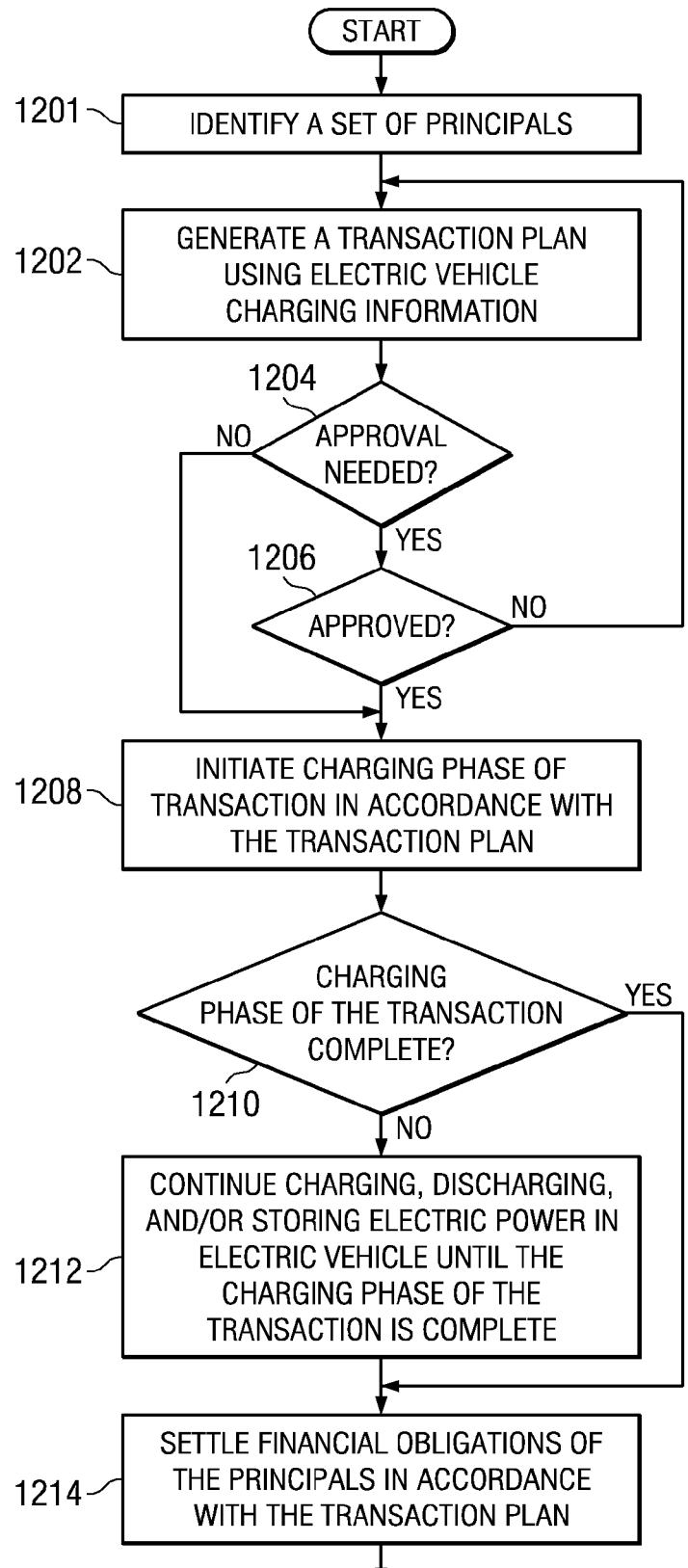
FIG. 12 is a flowchart illustrating an electric vehicle charging transaction in accordance with an illustrative embodiment.

Turning now to FIG. 12, a flowchart illustrating an electric vehicle charging transaction is shown in accordance with an illustrative embodiment. FIG. 12 is implemented by a software component for managing an electric vehicle charging transaction, such as electric vehicle charging transaction infrastructure 400 in FIG. 4.

The process begins by identifying a set of principals (step 1201) and generating a transaction plan using electric vehicle charging information (step 1202). The charging information may include, without limitation, preferences, device capabilities information, and information describing the current state of devices. A determination is made as to whether approval by one or more principals is needed (step 1204). If approval is needed, a determination is made as to whether approval is received (step 1206). In one embodiment, the transaction plan and/or a summary of the transaction plan is presented to one or more principals with a request for approval. If the one or more principals indicate approval of the transaction plan, the process determines that the transaction plan is approved. If approval is not received, a new transaction plan is generated at step 1202 and a new determination is made as to whether approval is needed at step 1204 and whether the transaction plan is approved at step 1206.

If the transaction plan is approved at step 1206, the charging phase of the charging transaction is initiated (step 1208). A determination is made as to whether the charging phase of the charging transaction is complete (step 1210). If the charging phase is not complete, the charging, discharging, and/or storing of electric power in the electric vehicle continues until the charging phase is complete (step 1212). Once the charging phase is complete, the financial obligations of the principals are settled in accordance with the transaction plan (step 1214) with the process terminating thereafter.

In another embodiment, the charging phase may be interrupted if an interrupt condition is detected. An interrupt condition may include a disconnection from the electric grid, a failure in a device associated with the electric vehicle or the charging station, or any other event causing an interruption in the charging phase.

Figure 13:
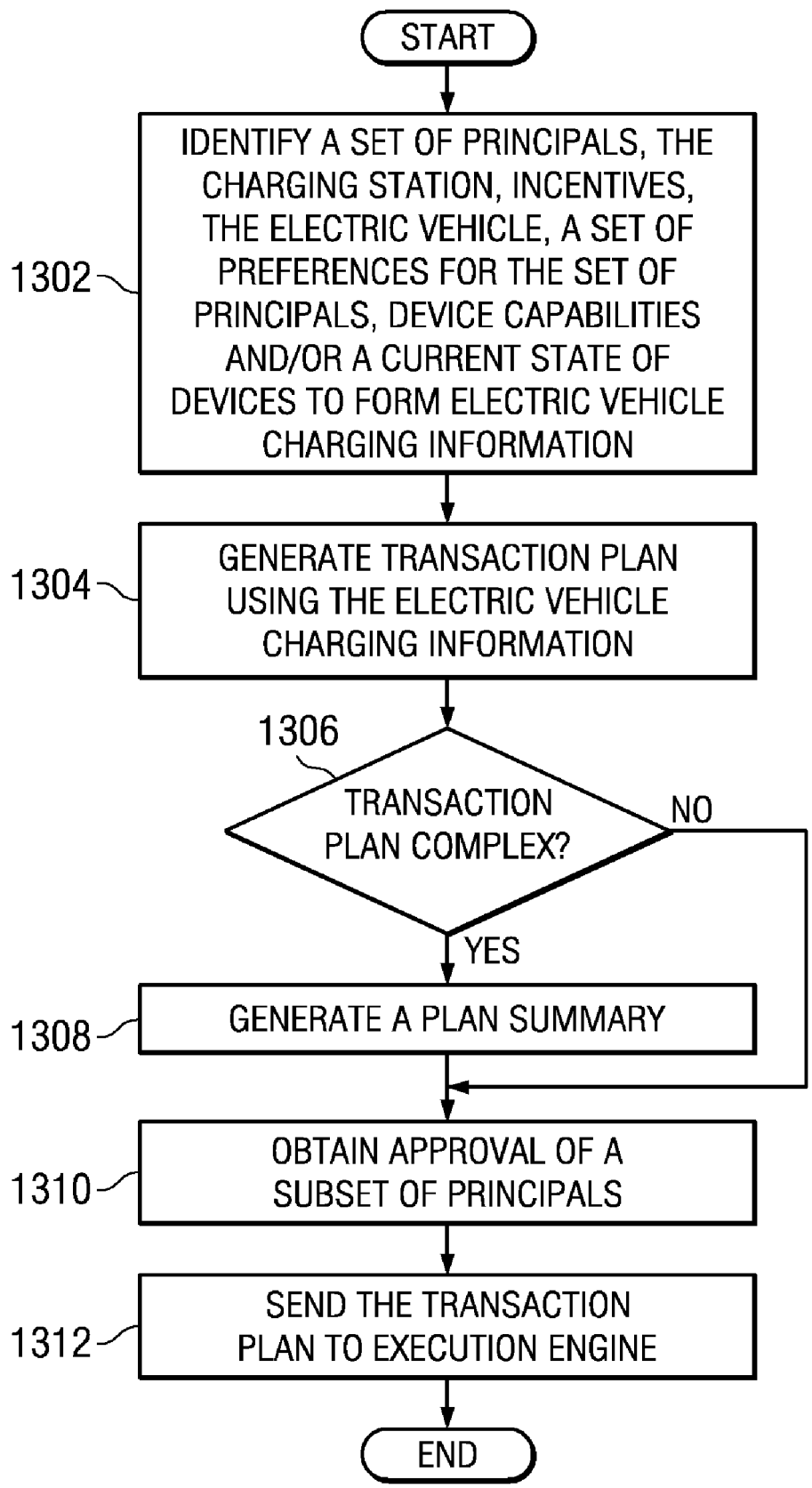
FIG. 13 is a flowchart illustrating a process for a pre-charge phase of a charging transaction in accordance with an illustrative embodiment.

FIG. 13 is a flowchart illustrating a process for a pre-charge phase of a charging transaction in accordance with an illustrative embodiment. The process in FIG. 13 may be implemented software for generating a customized, energy transaction plan, such as energy transaction planner 410 in FIG. 4 or energy transaction planner 506 in FIG. 5.

The energy transaction planner identifies a set of principals, the charging station, applicable incentives, the electric vehicle, a set of preferences for the set of principals, device capabilities, and/or a current state of devices to form electric vehicle charging information (step 1302). The energy transaction planner generates a transaction plan using the electric vehicle charging information (step 1304). The energy transaction planner makes a determination as to whether the transaction plan is complex (step 1306). If the plan is complex, the energy transaction planner generates a plan summary (step 1308). The energy transaction planner then obtains approval of the plan from a subset of principals (step 1310). This subset of principals may include no principals, a single principal, or two or more principals. In other words, the subset of principals may be a null set having no members. The energy transaction planner may send the transaction plan and/or the transaction plan summary to each principal in the subset of principals for approval. The energy transaction planner then sends the approved transaction plan to an execution engine for implementation during a charging phase (step 1312) with the process terminating thereafter. In another embodiment, steps 1304-1310 may be omitted if approval of the transaction plan is not needed.

Figure 14:
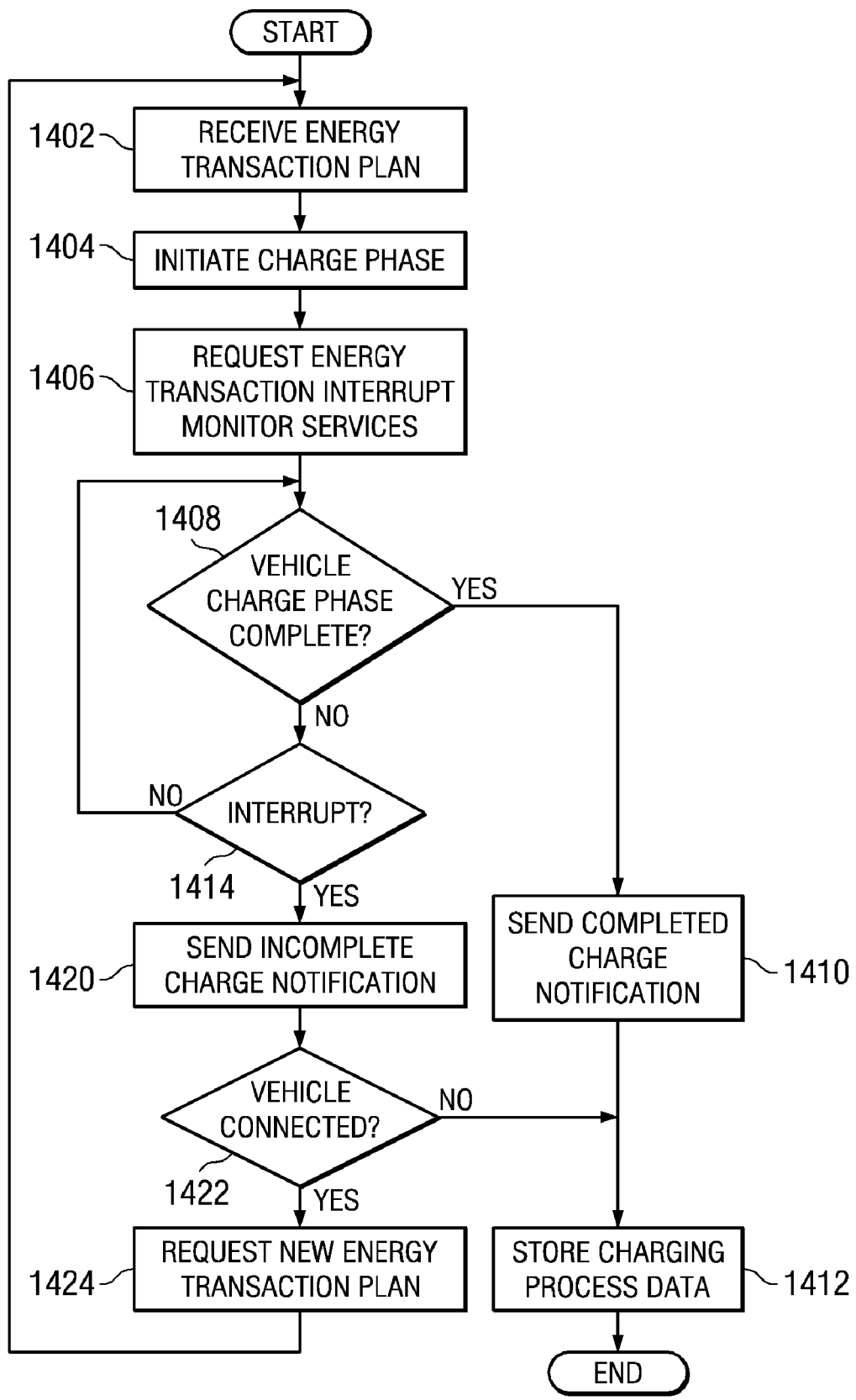
FIG. 14 is a flowchart illustrating a process for a charging phase and a post charging phase of an electric vehicle charging transaction in accordance with an illustrative embodiment.

FIG. 14 is a flowchart illustrating a process for a charging phase and a post charging phase of an electric vehicle charging transaction in accordance with an illustrative embodiment. The process begins by receiving an energy transaction plan (step 1402) from an energy transaction planner, such as energy transaction planner 410 in FIG. 4. The process then initiates a charging phase of a charging transaction (step 1404). In response to initiating the charging phase, the execution engine may trigger charging, discharging, or storing electricity in the electric vehicle.

The process requests energy transaction interrupt monitor services (step 1406). The energy transaction interrupt monitor is an energy transaction interrupt monitor such as energy transaction interrupt monitor 420 in FIG. 4. The process then makes the determination as to whether the charging phase is complete (step 1408). If the process makes the determination that the charging process is complete, then the process sends a completed charge notification for transmission (step 1410). The process then stores the charging process data (step 1412) and terminates thereafter.

Returning now to step 1408, if the process makes the determination that the vehicle charge is not complete, the process makes the determination as to whether an interruption is detected (step 1414). If an interruption is not detected, then the process returns to step 1408. However, if the process makes the determination that an interruption is detected, then the process sends an incomplete charge notification (step 1420) and makes a determination as to whether the electric vehicle is still connected to the charging station (step 1422). If the electric vehicle is still connected to the charging station, the process requests a new energy transaction plan (step 1424) and returns to step 1402. The new energy transaction plan may be requested from an energy transaction planner such as energy transaction planner 410 in FIG. 4.

FIG. 15 is a flowchart of a process for a post-charge process in an electric vehicle charge transactions. The process in FIG. 15 may be implemented by software, such as energy transaction broker 402 in FIG. 4.

The process begins by receiving a notification that the energy transaction is complete (step 1502). Thereafter, the energy transaction plan is retrieved (step 1504). The energy transaction plan may be retrieved from an energy transaction execution engine such as energy transaction execution engine 416 in FIG. 4. A payment due to a set of payees is calculated (step 1506). The payment is disbursed to the set of payees (step 1508) and the process terminates.

In one embodiment, before the payments are disbursed to the set of payees, the process may authenticate the energy transaction plan. Authentication may be achieved by implementing, for example, the use of passwords, encryption, or any other currently existing or later developed mechanism.

According to one embodiment of the present invention, a computer implemented method, apparatus, and computer program product is provided for managing an electric vehicle charging transaction. A set of principals associated with the electric vehicle charging transaction is identified. A principal in the set of principals is an entity having an interest in the electric vehicle charging transaction. Electric vehicle charging information is retrieved from a set of sources. An energy transaction plan is generated using the electric vehicle charging information. A charging phase of the electric vehicle charging transaction is initiated for an electric vehicle connected to a charging station in accordance with the energy transaction plan. The charging phase comprises at least one of charging the electric vehicle with electricity, storing electricity in an electric storage mechanism associated with the electric vehicle, and removing electricity from the electric storage mechanism to de-charge the electric vehicle. In response to completion of the charging phase, the process settles the financial obligations of a subset of principals in the set of principals in accordance with the energy transaction plan.

The electric vehicle charging transaction interface may be used to govern all aspects of an electric vehicle charging transaction. The electric vehicle charging transaction interface may also be used with additional infrastructure to provide electricity metering at the point of charge, identification of the various parties involved in the transaction, and flexible business rules governing the flow of funds between those parties.

The electric vehicle charging transaction interface permits a driver of an electric vehicle to plug his vehicle in at any location that has an electric outlet for charging and automatically identify the financial account responsible for settling the cost of charging the vehicle. The electric vehicle charging transaction interface identifies all parties that will be responsible for paying for a charging transaction and establishing a transaction plan to govern the charging transaction in accordance with the parties preferences and agreements.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An electric vehicle charging transaction interface comprising:
   a principal identification component, wherein the principal identification component identifies a set of principals associated with the electric vehicle charging transaction, wherein a principal in the set of principals is an entity having an interest in the electric vehicle charging transaction;
   an energy transaction planner, wherein the energy transaction planner generates an energy transaction plan using electric vehicle charging information, wherein the electric vehicle charging information is received from a set of sources;
   an execution engine, wherein the execution engine initiates a charging phase of the electric vehicle charging transaction for an electric vehicle connected to a charging station in accordance with the energy transaction plan, wherein the charging phase comprises at least one of charging the electric vehicle with electricity, storing electricity in an electric storage mechanism associated with the electric vehicle, and removing electricity from the electric storage mechanism to de-charge the electric vehicle;
   a vehicle preference service, wherein the electric vehicle charging information comprises a set of preferences, wherein the set of preferences comprises a subset of preferences for each principal in the set of principals, wherein a preference in the set of preferences specifies a parameter of the charging transaction that is to be minimized, maximized, or optimized, and wherein the vehicle preference service sends the set of preferences to the energy transaction planner to form the electric vehicle charging information; and an energy transaction broker, wherein the energy transaction broker settles financial obligations of a subset of principals in the set of principals in accordance with the energy transaction plan in response to completion of the charging phase.

2. The electric vehicle charging transaction interface of claim 1 further comprising:

an energy transaction plan approval service, wherein the energy transaction plan approval service receives the energy transaction plan and obtains approval of the energy transaction plan from a subset of principals in the set of principals.

3. The electric vehicle charging transaction interface of claim 1 further comprising:

an energy transaction plan approval service, wherein the energy transaction plan approval service generates a summary of the energy transaction plan in response to a determination that the energy transaction plan is a complex plan and sends the summary of the energy transaction plan with a request for approval of the energy transaction plan to a subset of principals in the set of principals for approval.

4. The electric vehicle charging transaction interface of claim 1 wherein the electric vehicle charging information comprises information describing capabilities of devices associated with the electric vehicle and information describing a current state of the devices associated with the electric vehicle.

5. The electric vehicle charging transaction interface of claim 1 further comprising:

an interrupt monitor, wherein the interrupt monitor detects an interrupt condition, sends an incomplete charge notification to an execution engine; and requests a new energy transaction plan in response to a determination that the electric vehicle is still connected to the charging station.

6. A computer implemented method for providing a charging transaction interface, the computer implemented method comprising:

identifying a set of principals associated with an electric vehicle charging transaction in a principal identification component, wherein a principal in the set of principals is an entity having an interest in the electric vehicle charging transaction;

generating an energy transaction plan in an energy transaction planner, wherein the energy transaction planner uses electric vehicle charging information received from a set of sources;

initiating a charging phase of the electric vehicle charging transaction for an electric vehicle connected to a charging station with an execution engine, wherein the execution engine initiates the charging phase in accordance with the energy transaction plan, wherein the charging phase comprises at least one of charging the electric vehicle with electricity, storing electricity in an electric storage mechanism associated with the electric vehicle, and removing electricity from the electric storage mechanism to de-charge the electric vehicle;

sending a set of preferences to the energy transaction planner to form the electric vehicle charging information using a vehicle preference service, wherein the electric vehicle charging information comprises a set of preferences, wherein the set of preferences comprises a subset of preferences for each principal in the set of principals, and wherein a preference in the set of preferences specifies a parameter of the charging transaction that is to be minimized, maximized, or optimized; and settling financial obligations of a subset of principals in the set of principals in accordance with the energy transaction plan in response to completion of the charging phase in an energy transaction broker.

7. The computer implemented method of claim 6 further comprising:

receiving the energy transaction plan at an energy transaction plan approval service to obtain approval of the energy transaction plan from a subset of principals in the set of principals.

8. The computer implemented method of claim 6 further comprising:

generating a summary of the energy transaction plan using an energy transaction plan approval service, wherein the energy transaction plan approval service generates the summary in response to a determination that the energy transaction plan is a complex plan and sends the summary of the energy transaction plan with a request for approval of the energy transaction plan to a subset of principals in the set of principals for approval.

9. The computer implemented method of claim 6 wherein the electric vehicle charging information comprises information describing capabilities of devices associated with the electric vehicle and information describing a current state of the devices associated with the electric vehicle.

10. The computer implemented method of claim 6 further comprising:

detecting an interrupt condition using an interrupt monitor, wherein the interrupt monitor sends an incomplete charge notification to an execution engine; and requesting a new energy transaction plan, by the interrupt monitor, in response to a determination that the electric vehicle is still connected to the charging station.

* * * * *